United States Patent [19]
Crandall et al.

[11] Patent Number: 6,100,945
[45] Date of Patent: Aug. 8, 2000

[54] COMPENSATOR ARRANGEMENTS FOR A CONTINUOUSLY VIEWABLE, DC FIELD-BALANCED, REFLECTIVE, FERROELECTRIC LIQUID CRYSTAL DISPLAY SYSTEM

[75] Inventors: Charles M. Crandall, Tucson, Ariz.; Mark A. Handschy, Boulder, Colo.; Michael R. Meadows, Nederland, Colo.; Bradley J. Sissom, Boulder, Colo.

[73] Assignee: Displaytech, Inc., Longmont, Colo.

[21] Appl. No.: 09/251,627

[22] Filed: Feb. 17, 1999

Related U.S. Application Data

[63] Continuation-in-part of application No. 09/025,160, Feb. 18, 1998, Pat. No. 6,016,173.

[51] Int. Cl.[7] .......................... G02F 1/135; G02F 1/1335
[52] U.S. Cl. ........................ 349/25; 349/96; 349/100; 349/117
[58] Field of Search ................................. 349/9, 25, 96, 349/100, 117, 119

[56] References Cited

U.S. PATENT DOCUMENTS

| | | | |
|---|---|---|---|
| 5,126,864 | 6/1992 | Akiyama et al. | 359/53 |
| 5,264,951 | 11/1993 | Takarashi et al. | 349/25 |
| 5,363,228 | 11/1994 | DeJule et al. | 359/117 |
| 5,418,380 | 5/1995 | Simon et al. | 250/550 |
| 5,495,351 | 2/1996 | Shingaki et al. | 359/53 |
| 5,568,287 | 10/1996 | Shingaki et al. | 359/53 |
| 5,615,025 | 3/1997 | Kaneko et al. | 349/74 |
| 5,716,122 | 2/1998 | Esaki et al. | 349/9 |
| 5,748,164 | 5/1998 | Handschy et al. | 345/89 |
| 5,808,800 | 9/1998 | Handschy et al. | 349/11 |
| 5,896,740 | 11/1999 | Robinson et al. | 349/201 |
| 6,025,890 | 2/2000 | Chase | 349/25 |

OTHER PUBLICATIONS

Douglas J. McKnight, "Continuous view of dc-balanced images on a ferroelectric liquid-crystal spatial light modulator", Sep. 15, 1994, Optics Letters, Optical society of America.

*Primary Examiner*—William L. Sikes
*Assistant Examiner*—Tarifur R. Chowdhury
*Attorney, Agent, or Firm*—Jay R Beyer; Stephen C. Shear

[57] ABSTRACT

A display system for acting on light entering the system includes a reflective ferroelectric liquid crystal spatial light modulator and a polarizer arrangement. The polarizer arrangement includes a polarizer for polarizing the light entering the system and directing the polarized light into the spatial light modulator along an optical path having an optical path axis. The reflective spatial light modulator acts on the polarized light to produce an optical output that is directed from the spatial light modulator back into the polarizing arrangement along substantially the same optical path axis that the polarized light is directed into the spatial light modulator. The polarizing arrangement also includes an analyzer configured to receive and analyze the optical output of the spatial light modulator and to direct the analyzed optical output out of the system. A compensator is positioned in the optical path between the polarizer of the polarizing arrangement and the spatial light modulator and in the optical path between the spatial light modulator and the analyzer. The compensator includes a layer of ferroelectric liquid crystal light modulating medium switchable between a first compensator state and a second compensator state. The compensator is configured such that the compensator inverts the optical output of the spatial light modulator when the compensator is switched to the second state. The layer of ferroelectric liquid crystal light modulating medium of the compensator and the spatial light modulator having retardances that are substantially different than one another.

15 Claims, 12 Drawing Sheets

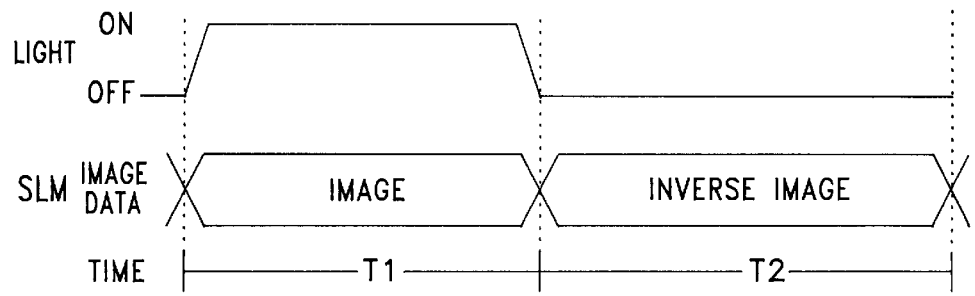
FIG. 1a (PRIOR ART)
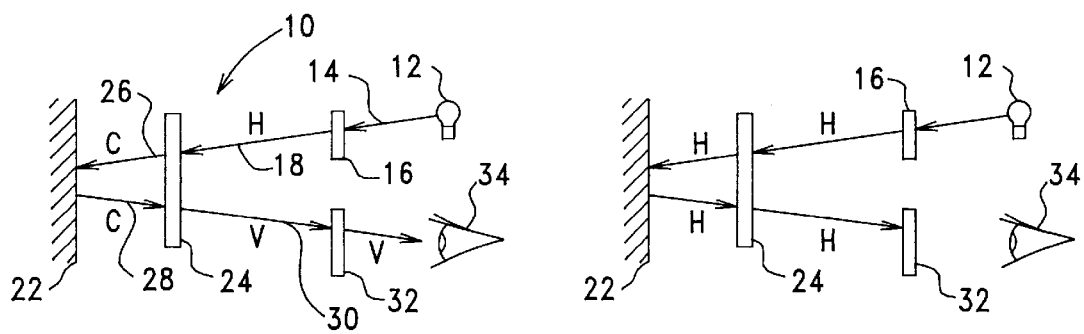
FIG. 1b (PRIOR ART)
FIG. 1c (PRIOR ART)
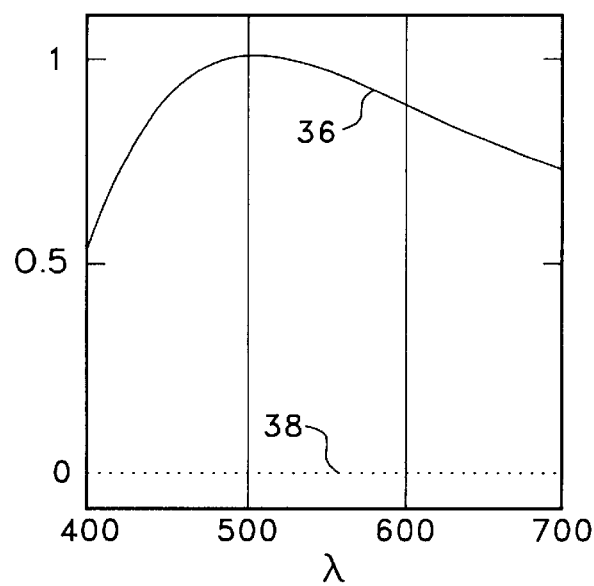
FIG. 1d (PRIOR ART)

COMPENSATOR ARRANGEMENTS FOR A CONTINUOUSLY VIEWABLE, DC FIELD-BALANCED, REFLECTIVE, FERROELECTRIC LIQUID CRYSTAL DISPLAY SYSTEM

CROSS REFERENCE TO RELATED APPLICATION

The present invention is a continuation-in-part of U.S. patent application Ser. No. 09/025,160 Feb. 18, 1998 U.S. Pat. No. 6,016,173 (Attorney Docket Number DIS-P011) entitled "OPTICS ARRANGEMENT INCLUDING A COMPENSATOR CELL AND STATIC WAVE PLATE FOR USE IN A CONTINUOUSLY VIEWABLE, REFLECTIVE MODE, FERROELECTRIC LIQUID CRYSTAL SPATIAL LIGHT MODULATING SYSTEM" (as Amended), filed Feb. 18, 1998, which application is incorporated herein by reference.

BACKGROUND OF THE INVENTION

The present invention relates generally to image generating systems including a reflective type, ferroelectric liquid crystal (FLC) spatial light modulator (SLM). More specifically, the invention relates to an optics arrangement including an FLC compensator cell for allowing the system to generate a substantially continuously viewable image while DC-balancing the FLC material of both the SLM and the compensator cell.

FLC materials may be used to provide a low voltage, low power reflective spatial light modulator due to their switching stability and their high birefringence. However, a problem with FLC materials, and nematic liquid crystal materials, is that the liquid crystal material may degrade over time if the material is subjected to an unbalanced DC electric field for an extended period of time. In order to prevent this degradation, liquid crystal spatial light modulators (SLMs) must be DC field-balanced.

Nematic liquid crystal materials respond to positive or negative voltages in a similar manner regardless of the sign of the voltage. Therefore, nematic liquid crystals are typically switched ON by applying either a positive or negative voltage through the liquid crystal material. Nematic liquid crystal materials are typically switched OFF by not applying any voltage through the material. Because nematic liquid crystal materials respond to voltages of either sign in a similar manner, DC balancing for nematic liquid crystal materials may be accomplished by simply applying an AC signal to create the voltage through the material. The use of an AC signal automatically DC balances the electric field created through the liquid crystal material by regularly reversing the direction of the electric field created through the liquid crystal material at the frequency of the AC signal.

In the case of FLC materials, the materials are switched to one state (i.e. ON) by applying a particular voltage through the material (i.e. +5 VDC) and switched to the other state (i.e. OFF) by applying a different voltage through the material (i.e. –5 VDC). Because FLC materials respond differently to positive and negative voltages, they cannot be DC-balanced in situations where it is desired to vary the ratio of ON time to OFF time arbitrarily. Therefore, DC field-balancing for FLC SLMs is most often accomplished by displaying a frame of image data for a certain period of time, and then displaying a frame of the inverse image data for an equal period of time in order to obtain an average DC field of zero for each pixel making up the SLMs.

In the case of an image generating system or display, the image produced by the SLM during the time in which the frame is inverted for purposes of DC field-balancing may not typically be viewed. If the system is viewed during the inverted time without correcting for the inversion of the image, the image would be distorted. In the case in which the image is inverted at a frequency faster than the critical flicker rate of the human eye, the overall image would be completely washed out and all of the pixels would appear to be half on. In the case in which the image is inverted at a frequency slower than the critical clicker rate of the human eye, the viewer would see the image switching between the positive image and the inverted image. Neither of these situations would provide a usable display.

In one approach to solving this problem, the light source used to illuminated the SLM is switched off or directed away from the SLM during the time when the frame is inverted. This type of system is described in copending U.S. patent application Ser. No. 08/361,775, filed Dec. 22, 1994, entitled DC FIELD-BALANCING TECHNIQUE FOR AN ACTIVE MATRIX LIQUID CRYSTAL IMAGE GENERATOR, which is incorporated herein by reference. However, this approach substantially limits the brightness and efficiency of the system. In the case where the magnitude of the electric field during the DC field-balancing and the time when the frame is inverted is equal to the magnitude of the electric field and the time when the frame is viewed, only a maximum of 50% of the light from a given light source may be utilized. This is illustrated in FIG. 1a which is a timing diagram showing the relationship between the switching on and off of the light source and the switching of the SLM image data.

As shown in FIG. 1a, the light source is switched on for a period of time indicated by T1. During this time T1, the SLM is switched to form a desired image. In order to DC balance the SLM, the SLM is switched to form the inverse of the desired image during a time period T2. In order to prevent this inverse image from distorting the desired image, the light source is switched off during the time T2 as shown in FIG. 1a.

In order to establish a convention to be used throughout this description, the operation of a given pixel 10 of a reflective type FLC SLM using the above mentioned approach of switching off the light source during the time the frame is inverted will be described with reference to FIGS. 1b–d. FIG. 1b shows pixel 10 when it is in its bright state and FIG. 1c shows pixel 10 when it is in its dark state. As illustrated in both FIGS. 1b and 1c, a light source 12 directs light, indicated by arrow 14, into a polarizer 16. Polarizer 16 is arranged to allow, for example, horizontally linearly polarized light, indicated by the reference letter H and by arrow 18, to pass through polarizer 16. However, polarizer 16 blocks any vertically linearly polarized component of the light and thereby directs only horizontally linearly polarized light into pixel 10. This arrangement insures that only horizontally linearly polarized light is used to illuminate pixel 10. For purposes of clarity throughout this description, the various configurations will be described using horizontally linearly polarized light as the initial input light for each of the various configurations.

As also illustrated in FIGS. 1b and 1c, pixel 10 includes a reflective backplane 22 and a layer of FLC material 24 which is supported in front of reflective backplane 22 and which acts as the light modulating medium. The various components would typically be positioned adjacent one another, however, for illustrative purposes, the spacing between the various components is provided. In this example, the FLC material has a thickness and a birefringence which cause the material to act as a quarter wave plate for a given wavelength. In this example, the FLC material is typical of those readily available and has a birefringence of 0.142. Therefore a thickness of 900 nm causes the SLM to act as a quarter wave plate for a wavelength of approximately 510 nm.

FLC material 24 has accompanying alignment layers (not shown) at the surfaces which have a buff axis or alignment axis that controls the alignment of the molecules of the FLC material. For this example of a reflective mode SLM, the SLM is oriented such that the alignment axis is rotated 22.5 degrees relative to the polarization of the horizontally linearly polarized light being directed into the SLM. The FLC also has a tilt angle of 22.5 degrees associated with the average optic axis of the molecules making up the FLC material. Therefore, when FLC material 24 of the pixel is switched to its first state, in this case by applying a +5 VDC electric field across the pixel, the optic axis is rotated to a 45 degree angle relative to the horizontally linearly polarized light. This causes the pixel to act as a quarter wave plate for horizontally linearly polarized light at 510 nm. Alternatively, when the pixel is switched to its second state, in this case by applying a −5 VDC electric field across the pixel, the optic axis is rotated to a zero degree angle relative to the horizontally linearly polarized light. This causes the pixel to have no effect on the horizontally linearly polarized light directed into the pixel. In other words, the tilt angle is the angle that the FLC optic axis is rotated one side or the other of the buff axis when the FLC material is switched to its first and second states.

Now that the configuration of the pixel for this example has been described, its effect on the light as it passes through the various elements will be described. Initially, it will be assumed the light is monochrome at the wavelength at which the SLM acts as a quarter wave plate, in this case 510 nm. As illustrated in FIG. 1b, when the FLC material is switched to its first state, which will be referred to hereinafter as its A state, FLC material 24 converts the 510 nm wavelength horizontally linearly polarized light directed into the pixel and indicated by arrow 18 into circularly polarized light indicated by the reference letters C and arrow 26. Reflective backplane 22 reflects this circularly polarized light as indicated by arrow 28 and directing it back into FLC material 24. FLC material 24 again acts on the light converting it from circularly polarized light to vertically linearly polarized light as indicated by reference letter V and arrow 30. The vertically linearly polarized light 30 is directed into an analyzer 32 which is configured to pass vertically linearly polarized light and block horizontally polarized light. Since analyzer 32 is arranged to pass vertically linearly polarized light, this vertically linearly polarized light indicated by arrow 30 passes through analyzer 32 to a viewing area indicated by viewer 34 causing the pixel to appear bright to the viewer.

Alternatively, as illustrated in FIG. 1c, FLC material 24 has no effect on the horizontally linearly polarized light directed into the pixel when the pixel is in its second state, which will be referred to hereinafter as its B state. This is the case regardless of the wavelength of the light. Therefore, the horizontally linearly polarized light passes through FLC material 24 and is reflected by reflective backplane 22 back into FLC material 24. Again, FLC material 24 has no effect on the horizontally linearly polarized light. And finally, since analyzer 32 is arranged to block horizontally linearly polarized light, the horizontally linearly polarized light is prevented from passing through to viewing area 34 causing the pixel to appear dark.

Although the polarization state of the light is relatively straight forward when the light is assumed to be at a wavelength at which the SLM acts as a quarter wave plate, it becomes more complicated when polychromatic light is used. This is because, even if the birefringence Δn of the FLC were constant, the retardance of the SLM in waves would vary with wavelength; furthermore, the birefringence of the FLC material also varies as the wavelength of the light varies. In display applications, this becomes very important due to the desire to provide color displays. FIG. 1d illustrates the effects the SLM has on visible light ranging in wavelength from 400 nm to 700 nm as a function of the wavelength of the light assuming typical FLC birefringence dispersions. Solid line 36 corresponds to the first case when the pixel is in its A state as illustrated in FIG. 1b and the dashed line 38 corresponds to the second case when the pixel is in its B state as illustrated in FIG. 1c. As is illustrated in FIG. 1d, the resulting output of this configuration varies substantially depending on the wavelength of the light as indicated by line 36. In fact, only a little more than 50% of the horizontally linearly polarized light at 400 nm that is directed into the SLM is converted to vertically linearly polarized light using this configuration.

The above described configuration makes use of crossed polarizers. That is, polarizer 16 blocks vertically linearly polarized light and analyzer 32 blocks horizontally linearly polarized light. This means that polarizer 16 and analyzer 32 must be different elements or must be provided as a polarizing beam splitter as will be described in more detail hereinafter. If both polarizer 16 and analyzer 32 were configured to pass the same polarization of light, they would be referred to as parallel polarizers and could be provided by the same element.

In an alternative system configuration, a polarizing beam splitter may be used to replace both the polarizer and the analyzer. FIGS. 1e and 1f illustrate such a system when pixel 10 is in its A and B states respectively. In this alternative system, light from light source 12 is directed into a polarizing beam splitter (PBS) 40 as indicated by arrow 42. PBS 40 is configured to reflect horizontally linearly polarized light as indicated by arrow 44 and pass vertically linearly polarized light as indicated by arrow 46. The horizontally linearly polarized light indicated by arrow 44 is directed into SLM 24.

When pixel 10 is in its A state as illustrated in FIG. 1e, SLM 24 acts as a quarter wave plate as described above converting the horizontally linearly polarized light to circularly polarized light and reflective backplane 22 reflects this light back into SLM 24. Again, SLM 24 converts this circularly polarized light into vertically linearly polarized light as described above for FIG. 1b and as indicated by arrow 48. Since PBS 40 is configured to pass vertically linearly polarized light, this light passes through PBS 40 into viewing area 34 causing pixel 10 to appear bright.

When pixel 10 is in its B state as illustrated in FIG. 1f, SLM 24 has no effect on the horizontally linearly polarized light. Therefore, the horizontally linearly polarized light that is directed into SLM 24 as indicated by arrow 44 remains horizontally linearly polarized light as it passes through SLM 24, is reflected by backplane 22, and again passes through SLM 24. However, since PBS 40 is configured to reflect horizontally linearly polarized light, this light is reflected back toward light source 12 as indicated by arrow 50 causing pixel 10 to appear dark. Therefore, PBS 40 acts in the same manner as the combination of polarizer 16 and analyzer 32 of FIGS. 1b and 1c. That is, PBS 40 acts in the same manner as crossed polarizers.

As mentioned above, in the configuration currently being described, the light source is turned off during the time in which the image is inverted for purposes of DC field-balancing the FLC material as illustrated in FIG. 1a. This substantially reduces the brightness or efficiency of the display. In order to overcome this problem of not being able to view the system during the DC field-balancing frame inversion time, compensator cells have been proposed for transmissive SLMs such as those described in U.S. Pat. No. 5,126,864, issued to Akiyama et al. These compensator cells are intended to correct for the frame inversion during the time when the FLC pixel is being operated in its inverted state. FIG. 2a illustrates a transmissive mode system 200 which includes an SLM 202, a compensator cell 204, a polarizer 206, and an analyzer 208.

As described above for the FLC material of the SLM of the previous configuration, SLM 202 and compensator cell 204 each include an FLC layer which is switchable between an A and a B state. This results in four possible combinations of states for the SLM and compensator cell. For purposes of consistency in comparing various configurations described herein, these four cases will be defined as follows:

Case 1—compensator cell in B state, SLM pixel in A state
Case 2—compensator cell in B state, SLM pixel in B state
Case 3—compensator cell in A state, SLM pixel in B state
Case 4—compensator cell in A state, SLM pixel in A state For this configuration, Cases 1 and 2 correspond to the normal operation of the system during which the compensator cell is in its B state and the SLM pixels are switched between their A and B states to respectively produce a bright or dark pixel. This is illustrated in the first half of FIG. 2b which is a timing diagram showing the states of the light source, the SLM, and the compensator cell. As shown in FIG. 2b, the light source remains ON throughout the operation of the system. During the first half of the time illustrated in FIG. 2b, the pixels of the SLM are switched between their A and B states to produce a desired image. Cases 3 and 4 correspond to the time during which the frame is inverted for purposes of DC field balancing (i.e. the SLM pixel states must be reversed) and the compensator cell is switched to its A state to compensate for the inversion. This is illustrated by the second half of the diagram of FIG. 2b. To properly DC field-balance the display as well as allow the display to be viewed continuously, Case 1 and Case 3 must give the same results and Case 2 and Case 4 must give the same results. That is, for this configuration, Cases 1 and 3 must both produce a bright pixel and Cases 2 and 4 must both produce a dark pixel.

In this example of a transmissive mode system, both the FLC layer of the SLM pixel and the compensator cell are 1800 nm thick which causes them to act as a half wave plate for a wavelength of 510 nm when in the A state. In this configuration, the polarizer and analyzer perform the functions performed by polarizer 16 and analyzer 32, or alternatively PBS 40, of the reflective mode systems described above. Polarizer 206 is positioned optically in front of compensator cell 204 and the SLM pixel 202 such that it allows only horizontally linearly polarized light to pass through it into compensator cell 204. Also, analyzer 208 which only allows vertically linearly polarized light to pass through is positioned optically behind SLM 202.

FIGS. 2c and 2d illustrate the net result the above described transmissive system configuration has on light directed in to the system. FIG. 2c shows the results for Case 1 and 2 during which the compensator cell is in its B state and the SLM is switched between its A state for Case 1 and its B state for Case 2. Case 1 is indicated by solid line 210 and Case 2 is indicated by dashed line 212. FIG. 2d shows the results for Case 3 and 4 during which the compensator cell is in its A state and the SLM is switched between its B state for Case 3 and its A state for Case 4. Case 3 is represented by solid line 214 and Case 4 is represented by dashed line 216.

As clearly shown by FIGS. 2c and 2d, this transmissive configuration produces identical results, that is a bright pixel, for Case 1 and 3 as indicated by lines 210 and 214, respectively. It also produces identical results for Cases 2 and 4 as indicated by lines 212 and 216, respectively. It should also be noted that this configuration produces relatively good results over the entire wavelength range from 400 nm to 700 nm. The worst results are at 400 nm where approximately 80% of the horizontally linearly polarized light is converted to vertically polarized light.

Although the compensator cell approach works well for a transmissive SLM as described above, applicant has found that this same general approach does not work as well for a reflective type SLM. To illustrate this difference, and referring to FIG. 3a, a reflective type display system 300 including a reflective type SLM 302 having a reflective backplane 303, a compensator cell 304, a polarizer 306, and an analyzer 308 will be described. Compensator cell 304 is positioned adjacent to SLM 302. As described above for FIGS. 1b and 1c, polarizer 306 is positioned to direct only horizontally linearly polarized light into compensator cell 304. Because the light passes through the SLM and the compensator cell twice in a reflective mode system, the FLC material of SLM 302 and compensator cell 304 are configured to act as quarter wave plates for a wavelength of 510 nm rather than half wave plates as described above for the transmissive system of FIG. 2a.

In this example, the FLC materials of both SLM 302 and compensator cell 304 are 900 nm thick and both have a tilt angle of 22.5 degrees. The buff axis of the SLM is aligned with the horizontally linearly polarized light directed into the system by polarizer 306. Also, the buff axis of compensator cell 304 is positioned perpendicular to the buff axis of SLM 302. FIGS. 3b and 3c illustrate the net result that system 300 has on light directed in to the system. FIG. 3b shows the results for Case 1 and 2 during which the compensator cell is in its B state and the SLM is switched between its A state for Case 1 and its B state for Case 2. Case 1 is indicated by solid line 310 and Case 2 is indicated by dashed line 312. FIG. 3c shows the results for Case 3 and 4 during which the compensator cell is in its A state and the SLM is switched between its B state for Case 3 and its A state for Case 4. Case 3 is represented by solid line 314 and Case 4 is represented by dashed line 316.

As clearly shown by FIGS. 3b and 3c, system 300 produces identical results, that is, a bright pixel for Case 1 and 3 as indicated by lines 310 and 314, respectively. It also produces identical results for Cases 2 and 4 as indicated by lines 312 and 316, respectively. However, this configuration does not produce very good results over the entire wavelength range from 400 nm to 700 nm. The worst results are at 400 nm where only approximately 5% of the horizontally linearly polarized light is converted to vertically polarized light. At a wavelength of about 500 nm about 50% of the horizontally linearly polarized light is converted to vertically linearly polarized light. The best results are at 700 nm where about 80% of the horizontally linearly polarized light is converted to vertically linearly polarized light. Since the point to adding the compensator cell is to increase the efficiency or brightness of the system, this arrangement does not improve the efficiency or brightness for the lower wavelength range when compared to the system of FIG. 1b and 1c which simply turns OFF the light source during the DC field-balancing time.

As can be clearly seen when comparing FIGS. 3b–c to FIGS. 2c–d, the effects on the light caused by the various components of the reflective configuration of FIG. 3a are very much different from the effects on the light caused by the transmissive configuration of FIG. 2a. That is, the reflective configuration of FIG. 3a is not optically equivalent to the transmissive configuration of FIG. 2a even though it may initially seem as though they should be optically equivalent. These two configurations are optically different from one another because the light must pass through the SLM and compensator cell twice in the reflective configuration with the first pass through the compensator being before the two passes through the SLM and the second pass through the compensator cell being after the two passes through the SLM.

Due to this difference in the transmissive and reflective configurations, it has proved difficult to provide a reflective type system which is DC field-balanced and is substantially continuously viewable while providing improved efficiency or brightness compared to a system which simply turns off the light source during the DC field-balancing portion of the frame. The present invention provides arrangements and methods for overcome this problem.

SUMMARY OF THE INVENTION

As will be described in more detail hereinafter, display system for acting on light entering the system is herein disclosed. The display system includes a reflective ferroelectric liquid crystal spatial light modulator having a layer of ferroelectric liquid crystal light modulating medium divided into an array of individually controllable pixels. Each pixel is switchable between a first pixel state and a second pixel state. A polarizer arrangement includes a polarizer for polarizing the light entering the system and directing the polarized light into the spatial light modulator along an optical path having an optical path axis. The reflective spatial light modulator acts on the polarized light to produce an optical output that is directed from the spatial light modulator back into the polarizing arrangement along substantially the same optical path axis that the polarized light is directed into the spatial light modulator. The polarizing arrangement also includes an analyzer configured to receive and analyze the optical output of the spatial light modulator and to direct the analyzed optical output out of the system. In one embodiment of the polarizing arrangement, the polarizing arrangement is a polarizing beam splitting cube that acts as both the polarizer and the analyzer.

A compensator is positioned in the optical path between the polarizer of the polarizing arrangement and the spatial light modulator and in the optical path between the spatial light modulator and the analyzer. The compensator includes a layer of ferroelectric liquid crystal light modulating medium switchable between a first compensator state and a second compensator state. The compensator is used to invert the optical output of the spatial light modulator when the compensator is switched to the second compensator state. In accordance with one aspect of the invention, the layer of ferroelectric liquid crystal light modulating medium of the compensator and the spatial light modulator have single pass retardances that are substantially different than one another. In one embodiment, the layer of ferroelectric liquid crystal light modulating medium of the compensator has a thickness substantially different than the thickness of the layer of ferroelectric liquid crystal light modulating medium of the spatial light modulator.

The compensator and the spatial light modulator combine so as to cause the display system to operate such that each pixel is capable of producing four different optical intensities for a display output corresponding to that pixel. During a first case when the compensator is in the first compensator state and one of the pixels of the spatial light modulator is in the first pixel state, the display output corresponding to that pixel is a first optical intensity. During a second case when the compensator is in the first compensator state and one of the pixels of the spatial light modulator is in the second pixel state, the display output corresponding to that pixel is a second optical intensity. During a third case when the compensator is in the second compensator state and one of the pixels of the spatial light modulator is in the first pixel state, the display output corresponding to that pixel is a third optical intensity. And, during a fourth case when the compensator is in the second compensator state and one of the pixels of the spatial light modulator is in the second pixel state, the display output corresponding to that pixel is a fourth optical intensity. In accordance with this embodiment of the invention, the first and fourth optical intensities being substantially equal and the second and third optical intensities being substantially equal.

In one embodiment of the invention, the layer of ferroelectric liquid crystal light modulating medium of the compensator is a thickness and retardance that causes the compensator to function as approximately a half wave plate for visible. Also, the layer of ferroelectric liquid crystal light modulating medium associated with a pixel of the spatial light modulator is a thickness and retardance that causes the pixel to function as approximately a quarter wave plate for visible light.

The polarizing arrangement of the display system has a primary axis and the polarizer allows substantially only linearly polarized light aligned with the primary axis of the polarizer to pass through the polarizer toward the spatial light modulator. Also, the layer of ferroelectric liquid crystal light modulating medium of both the compensator and the spatial light modulator each have an associated buff axis and tilt angle. When the layer of ferroelectric liquid crystal light modulating medium of the compensator and the spatial light modulator are switched to their first states, the ferroelectric liquid crystal material is aligned generally at the tilt angle in a particular direction from the buff axis. Alternatively, when the layer of ferroelectric liquid crystal light modulating medium of the compensator and the spatial light modulator are switched to their second states, the ferroelectric liquid crystal material is aligned generally at the tilt angle in a direction opposite the particular direction from the buff axis. In another embodiment of the invention, the tilt angle of the layer of ferroelectric liquid crystal light modulating medium of the compensator is approximately one half that of the tilt angle of the layer of ferroelectric liquid crystal light modulating medium of the spatial light modulator.

In one version of the above described embodiment in which the tilt angle of the layer of ferroelectric liquid crystal light modulating medium of the compensator is approximately one half that of the tilt angle of the layer of ferroelectric liquid crystal light modulating medium of the spatial light modulator, the polarizer arrangement acts as crossed polarizers. In this embodiment, the buff axis associated with the layer of ferroelectric liquid crystal light modulating medium of the spatial light modulator is oriented perpendicular to the buff axis associated with the layer of ferroelectric liquid crystal light modulating medium of the compensator. Also, the buff axis associated with the layer of ferroelectric liquid crystal light modulating medium of either the compensator or the spatial light modulator is aligned with the primary axis of the polarizer.

In another version of the immediately above described embodiment, the polarizer arrangement again acts as crossed polarizers. The buff axis associated with the layer of ferroelectric liquid crystal light modulating medium of the spatial light modulator is now oriented 112.5 degrees relative to the primary axis of the polarizer while the buff axis associated with the layer of ferroelectric liquid crystal light modulating medium of the compensator is oriented 11.25 degrees relative to the primary axis of the polarizer.

In another embodiment, the system includes a heating arrangement for heating the layer of ferroelectric liquid crystal light modulating medium of the compensator in order to maintain the layer of ferroelectric liquid crystal light modulating medium of the compensator at a substantially constant temperature. In one version of this embodiment, the compensator includes a transparent ITO layer that acts as the heating arrangement. In another version, the compensator and the spatial light modulator are positioned adjacent one another and in direct contact with one another. In this version, the heating arrangement is configured to maintain the layers of ferroelectric liquid crystal light modulating medium of both the compensator and the spatial light modulator at a substantially constant temperature. Also, the layer of ferroelectric liquid crystal light modulating medium of the compensator has a tilt angle approximately one half that of the layer of ferroelectric liquid crystal light modulating medium of the spatial light modulator at the constant temperature maintained by the heating arrangement.

In another embodiment, the layer of ferroelectric liquid crystal light modulating medium of the compensator and the spatial light modulator are switched to and maintained in their first and second states by establishing and maintaining certain drive voltages through the layers of ferroelectric liquid crystal light modulating medium. In this embodiment, the system uses lower compensator drive voltages to maintain the layer of ferroelectric liquid crystal light modulating medium of the compensator in the first and second compensator states compared to the drive voltages used to maintain the layer of ferroelectric liquid crystal light modulating medium of the spatial light modulator in the first and second pixel states. The lower compensator drive voltages cause the tilt angle of the layer of ferroelectric liquid crystal light modulating medium of the compensator to be approximately one half that of the tilt angle of the layer of ferroelectric liquid crystal light modulating medium of the spatial light modulator. In one version of this embodiment, the compensator drive voltages used to maintain the layer of ferroelectric liquid crystal light modulating medium of the compensator in the first and second compensator states include a leading edge spike of voltage at a voltage greater than the compensator drive voltages. This leading edge spike of voltage improves the speed at which the layer of ferroelectric liquid crystal light modulating medium of the compensator may be switched between the first and second compensator states.

BRIEF DESCRIPTION OF THE DRAWINGS

The features of the present invention may best be understood by reference to the following description of the presently preferred embodiments together with the accompanying drawings.

FIG. 1a is a timing diagram illustrating the timing at which a light source for a prior art DC-balanced display system is switched ON and OFF.

FIGS. 1b and 1c are diagrammatic cross sectional views of a pixel of a prior art reflective type SLM display system illustrating how the pixel acts on light when the pixel is in the ON and OFF states.

FIG. 1d is a graph illustrating the effects the system of FIG. 1b and 1c has on light after it passes through the system.

DETAILED DESCRIPTION OF THE PREFERRED EMBODIMENTS

An invention is described for providing methods and apparatus for producing a substantially continuously viewable reflective type SLM display system which is DC field-balanced and which is more efficient or brighter than would be possible using a reflective type SLM display system which simply turns off the light source during the DC field balancing portion of each image frame. In the following description, numerous specific details are set forth in order to provide a thorough understanding of the present invention. However, based on the following description, it will be obvious to one skilled in the art that the present invention may be embodied in a wide variety of specific configurations. Also, well known processes for producing various components and certain well known optical effects of various optical components will not be described in detail in order not to unnecessarily obscure the present invention.

Figure 4A:
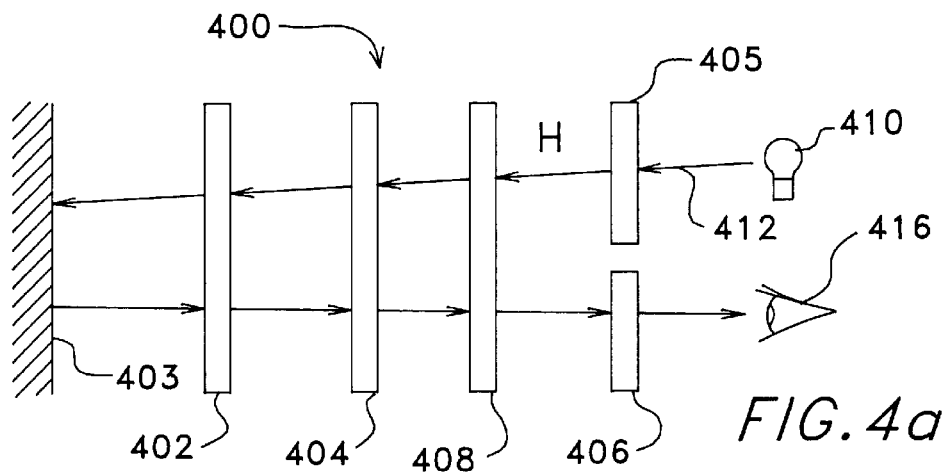
FIG. 4a is a diagrammatic cross sectional view of a first embodiment of a reflective SLM display system designed in accordance with the present invention.

Referring initially to FIG. 4a, the present invention will be described with reference to a first embodiment of the invention which takes the form of a reflective type SLM display system generally designated by reference numeral 400. As illustrated in FIG. 4a, system 400 includes an SLM 402 having a reflective backplane 403, a compensator cell 404, a polarizer 405, and an analyzer 406. Alternatively, in the same manner as described above, crossed polarizer 405 and analyzer 406 may be replaced with a polarizing beam splitter.

Figure 3A:
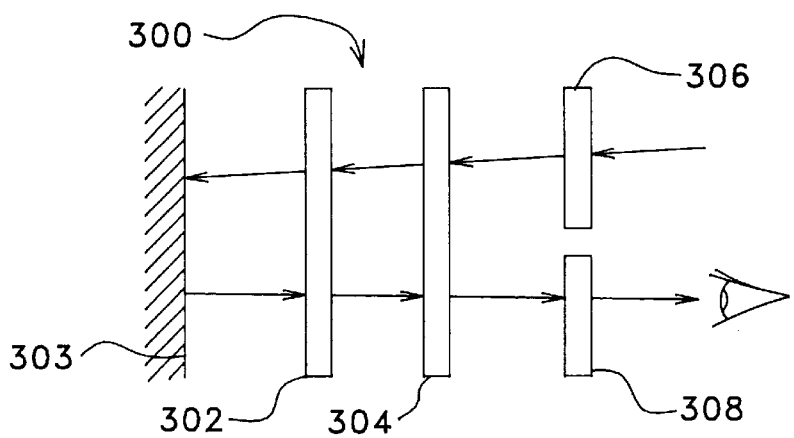
FIG. 3a is a diagrammatic cross sectional view of a prior art reflective SLM display system.

System 400 is configured in a manner similar to that described above for system 300 of FIG. 3a. That is, compensator cell 404 is positioned adjacent SLM 402. Also, polarizer 405 is positioned to direct only horizontally linearly polarized light into compensator cell 404. Similarly, analyzer 406 allows only vertically linearly polarized light to pass through it and into the viewing area after the light directed in to the system has passed through compensator cell 404 and SLM 402 and been reflected back through SLM 402 and compensator cell 404. However, in accordance with the invention, system 400 also includes a static quarter wave plate 408 positioned optically between compensator cell 404 and polarizer 405 and analyzer 406.

As would be understood by those skilled in the art, SLM 402 may be made up of an array of any number of individually controllable pixels which are individually switchable between two states. For purposes of consistency, it will be assumed that each pixel is switched to its A state by applying a +5 VDC electric field through the pixel and each pixel is switched to its B state by applying a −5 VDC electric field through the pixel. It should be understood that the present invention is not limited to these specific voltages and would equally apply regardless of the voltages used to switch the pixels.

Figure 1E:
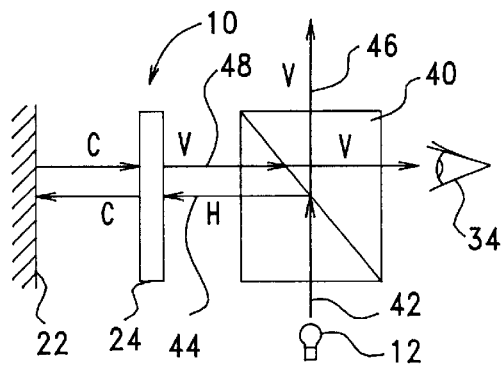
FIGS. 1e and 1f are diagrammatic cross sectional views of a pixel of a prior art reflective type SLM display system including a polarizing beam splitter.
Figure 1F:
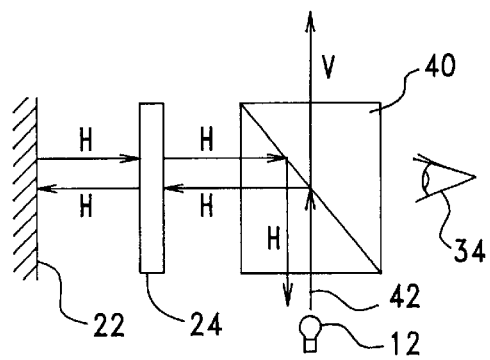
Figure 2A:
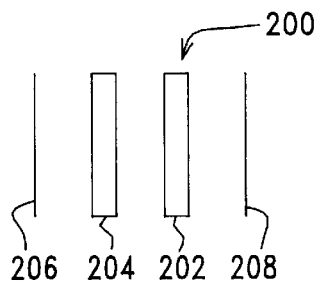
FIG. 2a is a diagrammatic cross sectional view of a prior art transmissive SLM display system.
Figure 2B:
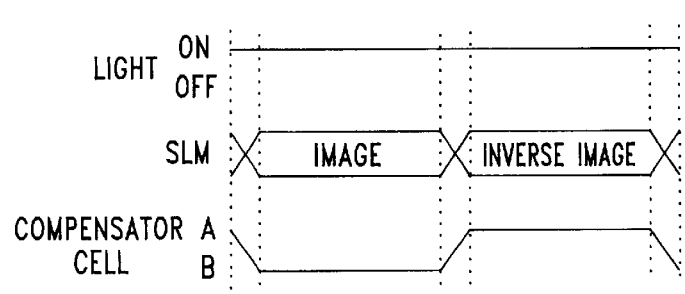
FIG. 2b is a timing diagram illustrating the timing at which a light source for a prior art DC-balanced display system is switched ON and OFF.
Figure 2C:
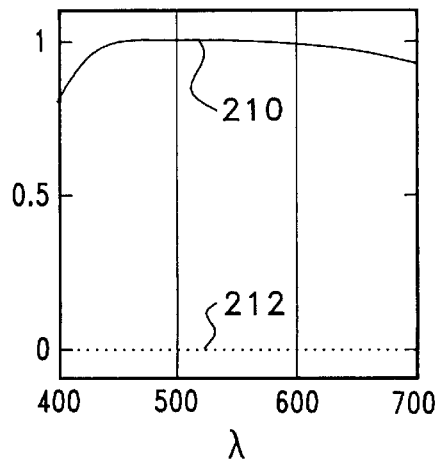
FIGS. 2c and 2d are graphs illustrating the effects the system of FIG. 2a has on light after it passes through the system.
Figure 2D:
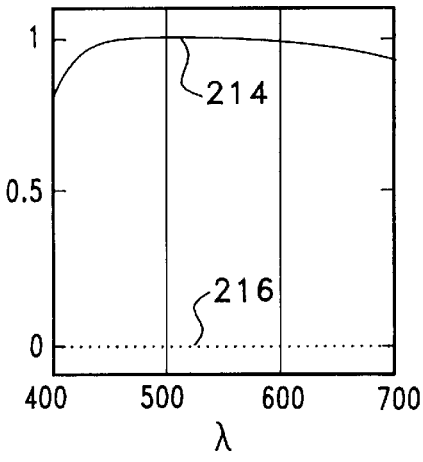

System 400 further includes a light source 410 for directing light into the system in a manner similar to that described above for FIGS. 1b and 1c. With this configuration, light source 410 directs light into polarizer 405 as indicated by arrow 412. Polarizer 405 blocks any vertically linearly polarized portions of the light from passing through polarizer 405 an allows only horizontally linearly polarized portions of the light to pass through polarizer 405 into static quarter wave plate 408. This light passes through static quarter wave plate 408, compensator cell 404, and SLM 402 and is then reflected by reflective backplane 403 back through SLM 402, compensator cell 404, and static wave plate 408 to analyzer 406 as illustrated in FIG. 4a. Analyzer 406 then blocks any horizontally linearly polarized portions of the light and allows only vertically linearly polarized portions of the light to pass through it to a viewing area indicated by viewer 416. Since polarizer 405 blocks vertically linearly polarized light and analyzer 406 blocks horizontally linearly polarized light, this type of system is referred to as using crossed polarizers.

For this embodiment and as described above for system 300, because the light passes through the SLM and the compensator cell twice in a reflective mode system, the FLC material of SLM 402 and compensator cell 404 are configured to act as quarter wave plates for a wavelength of 510 nm. In this configuration, the FLC materials of both SLM 402 and compensator cell 404 are 900 nm thick and both have a tilt angle of 22.5 degrees. In this specific embodiment, the buff axis of the SLM is positioned at a 22.5 degree angle relative to the horizontally linearly polarized light directed into the system. Also, for this embodiment, the buff axis of compensator cell 404 is positioned perpendicular to the buff axis of SLM 402.

Although the buff axis of the SLM is described as being positioned at 22.5 degrees relative to the horizontally linearly polarized light directed into the system, this is not a requirement. In fact, this configuration works equally as well regardless of the orientation of the SLM buff axis relative to the horizontally linearly polarized light directed into the system so long as the buff axis of the compensator cell is oriented perpendicular to the buff axis of the SLM. This freedom in orienting the buff axis of the SLM relative to the horizontally linearly polarized light directed into the system makes this overall system easier to produce than other conventional systems because only the orientation of the SLM relative to the compensator cell must be precisely controlled.

The orientation of the static quarter wave plate relative to the horizontally linearly polarized light directed into the system is also important. Generally, static quarter wave plate 408 has a primary axis which is oriented at a 45 degree angle to the horizontally linearly polarized light directed into the quarter wave plate.

Although the tilt angles of SLM 402 and compensator cell 404 are described as being 22.5 degrees, this is not a requirement. The configuration described above for this embodiment works regardless of the tilt angle of the FLC material of the SLM and the compensator cell, but works best when the tilt angles of the two components are the same. Therefore, it should be understood that the present invention would equally apply to systems using SLMs and compensator cells having tilt angles other than 22.5 degrees. With this configuration, the bright states obtained by the system remain bright regardless of the tilt angle used provided the tilt angles match. However, the use of tilt angles in the range of 22.5 to 25.5 degrees provides optimum dark state extinction, with the choice of tilt angle at the low end of the range providing best extinction over a narrow range of wavelengths centered on the wavelength for which the SLM and compensator have quarter-wave retardance and with the choice of tilt angle towards the upper end of the range providing good extinction over a more extended range of wavelength. Increasing the tilt angle past 25.5 degrees eventually reduces dark state extinction.

Figure 4B:
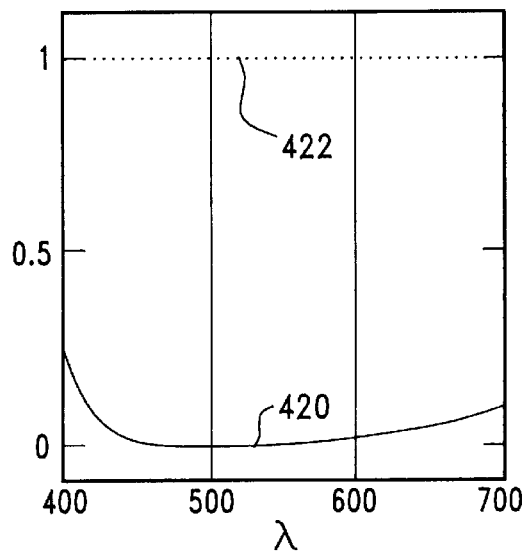
FIGS. 4b–c are graphs illustrating the effects the system of FIG. 4a has on light after it passes through the system.
Figure 4C:
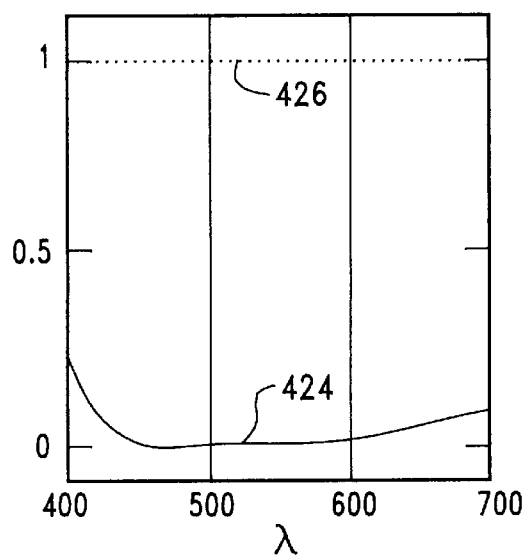

Now that the physical configuration of system 400 has been described, its effect on light directed into system 400 will be described. FIGS. 4b and 4c illustrate the net result that system 400 has on light directed in to the system. FIG. 4b shows the results for Case 1 and 2 during which the compensator cell is in its B state and the SLM is switched between the A state for Case 1 and the B state for Case 2. Case 1 is indicated by solid line 420 and Case 2 is indicated by dashed line 422. FIG. 4c shows the results for Case 3 and 4 during which the compensator cell is in its A state and the SLM is switched between the B state for Case 3 and the A state for Case 4. Case 3 is represented by solid line 424 and Case 4 is represented by dashed line 426. Cases 1–4 correspond to Cases 1–4 for the systems described above in the background.

As illustrated in FIGS. 4b and 4c, because of quarter wave plate 408 is included in the configuration of system 400, Cases 1 and 3 result in a dark pixel rather than a bright pixel and Cases 2 and 4 result in a bright pixel rather than a dark pixel. This is the opposite of the results described in the background. However, this inversion of the bright and the dark states may be compensated for in a variety of ways such as reversing the A and the B states for the SLM (i.e. using a −5 VDC to switch the pixel to the A state and using a 5 VDC to switch the pixel to the B state). The important thing is that the results of Cases 1 and 3 are identical and the results of Cases 2 and 4 are identical.

For system 400, static quarter wave plate 408 is preferably a readily providable achromatic quarter wave plate. The use of an achromatic static quarter wave plate provides the best results over a broad color spectrum because it flattens out the curves 422 of FIG. 4b and 426 of FIG. 4c representing the bright states obtained by Case 1 and Case 2. This flattening out of the curve improves the optical throughput of system 400 by increasing the amount of light which passes through the system for a given pixel when the combination of that pixel and the other elements are switched to produce a bright state.

Figure 5A:
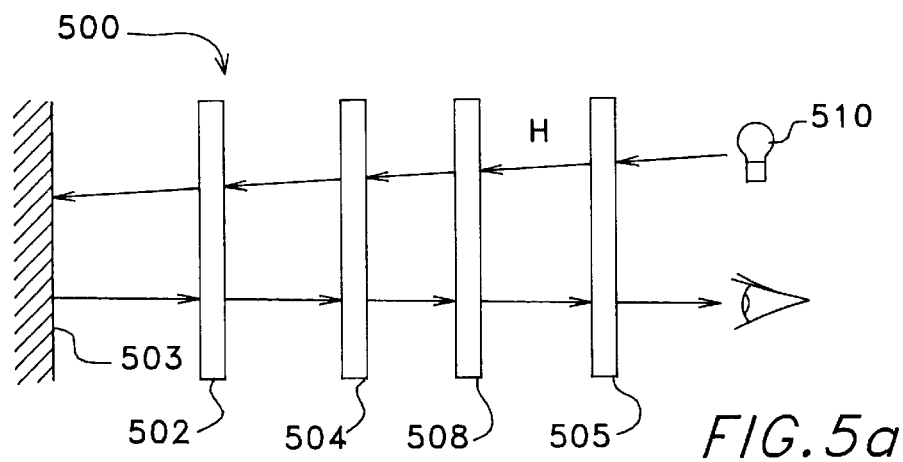
FIG. 5a is a diagrammatic cross sectional view of a second embodiment of a reflective SLM display system designed in accordance with the present invention.
Figure 5B:
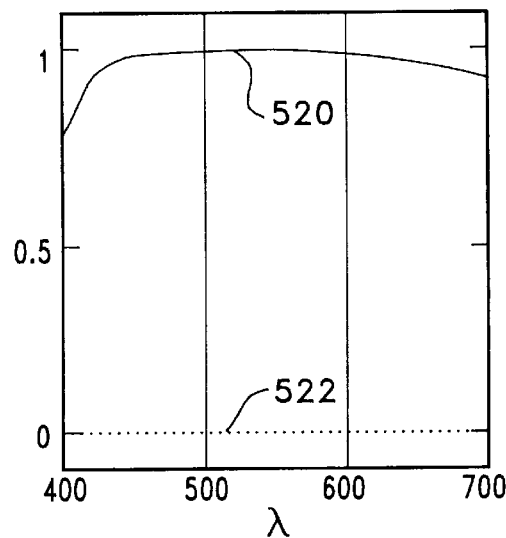
FIGS. 5b–c are graphs illustrating the effects the system of FIG. 5a has on light after it passes through the system.
Figure 5C:
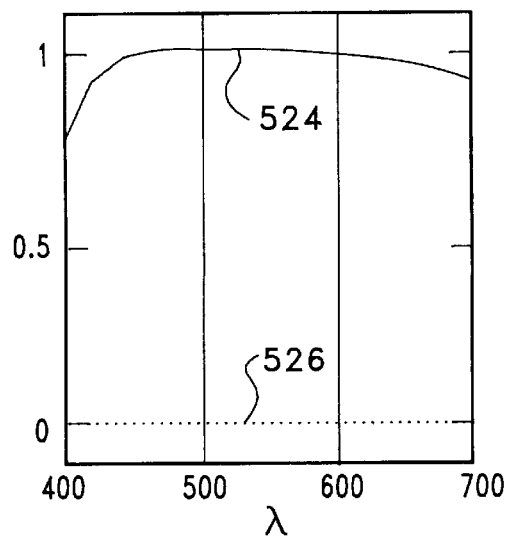

In one embodiment of the invention which reverses the bright and dark states described above for FIGS. 4a–c, parallel polarizers are used instead of crossed polarizers. FIG. 5a–c illustrate a system 500 which utilizes parallel polarizers. As described above for system 400, system 500 includes a SLM 502, a reflective backplane 503, a compensator cell 504, a polarizer 505, a static quarter wave plate 508, and a light source 510. Light source 510 directs light into polarizer 505 which blocks any vertically linearly polarized light and allows only horizontally linearly polarized light to pass through. This horizontally linearly polarized light then passes through and is acted upon by static quarter wave plate 508, compensator cell 504, SLM 502, and reflective backplane 503 in the same way as described above for FIG. 4a. However, in this embodiment, polarizer 505 also acts as the analyzer for the system. This use of polarizer 505 for both the polarizer and the analyzer is what makes this system a parallel polarizer system.

In the configuration of FIG. 5a, polarizer 505 acts as the analyzer by blocking any vertically linearly polarized light and allowing any horizontally linearly polarized light to pass into the viewing area. This is the opposite of the polarizations of light blocked and passed by analyzer 406 in system 400. This has the effect of reversing the bright and dark states of the system and results in the net effects illustrated in FIGS. 5b and 5c. FIG. 5b shows the results for Case 1 and 2 during which the compensator cell is in its B state and the SLM is switched between the A state for Case 1 and the B state for Case 2. Case 1 is indicated by solid line 520 and Case 2 is indicated by dashed line 522. FIG. 5c shows the results for Case 3 and 4 during which the compensator cell is in its A state and the SLM is switched between the B state for Case 3 and the A state for Case 4. Case 3 is represented by solid line 524 and Case 4 is represented by dashed line 526. Cases 1–4 correspond to Cases 1–4 for the systems described above in the background and Cases 1–4 described above for FIG. 4.

Figure 3B:
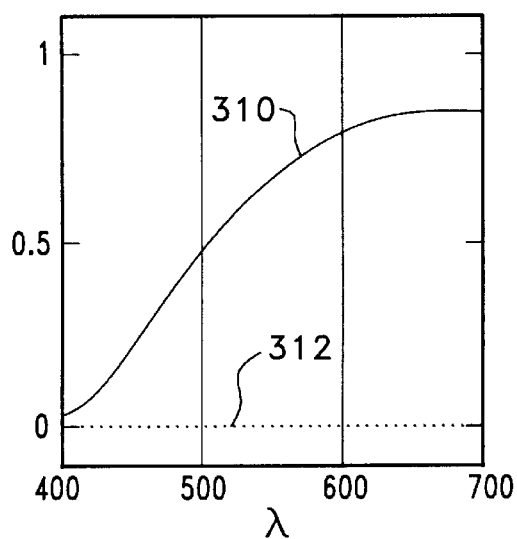
FIGS. 3b and 3c are graphs illustrating the effects the system of FIG. 3a has on light after it passes through the system.
Figure 3C:
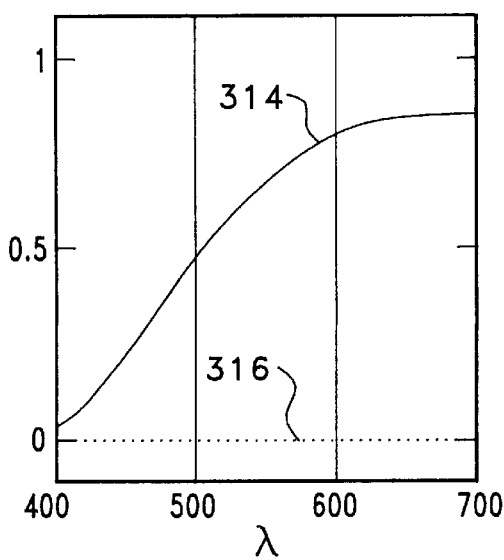

As clearly shown by FIGS. 5b and 5c, system 500 produces identical results, that is, a bright pixel for Case 1 and 3 as indicated by lines 520 and 524, respectively. It also produces identical results for Cases 2 and 4 as indicated by lines 522 and 526, respectively. This configuration also produces very good results over the entire wavelength range from 400 nm to 700 nm. In fact, as illustrated by lines 522 and 526, this configuration provides substantially uniform blockage of the entire range of wavelengths of the light that is directed into the spatial light modulator. Also, in both Cases 1 and 3, a large portion of the horizontally linearly polarized light passes through the system for the entire range of 400 nm to 700 nm. Since the point to adding the compensator cell is to increase the efficiency or brightness of the system, this arrangement dramatically improves the efficiency or brightness of system 500 over the complete wavelength range when compared to the system of FIG. 1b and 1c which simply turns OFF the light source during the DC field-balancing time. This also substantially improves the efficiency of the system compared to system 300 of FIG. 3 described above which does not include the static quarter wave plate. Furthermore, since essentially no light from the light source passes through the system to the viewing area when the elements are switched to produce a dark state as indicated by lines 522 and 526, this configuration also provides an excellent contrast ratio.

Figure 6:
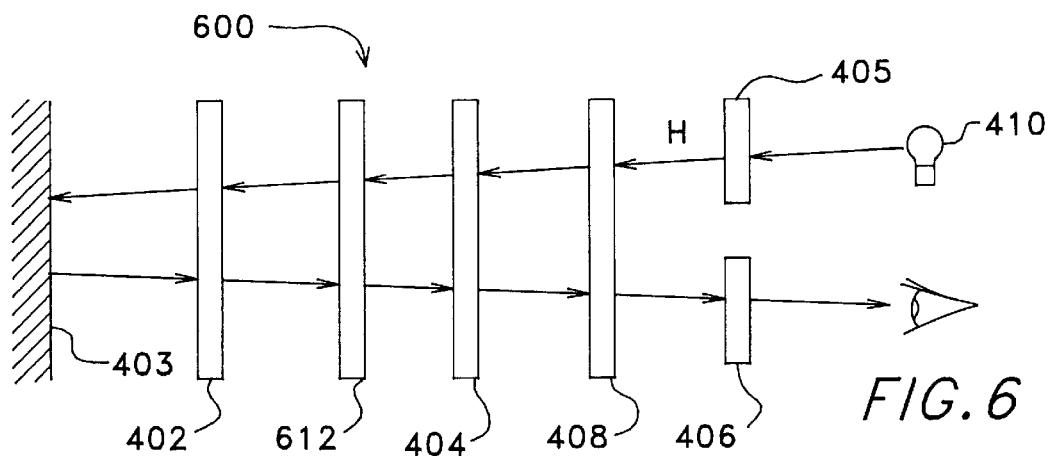
FIG. 6 is a diagrammatic cross sectional view of a third embodiment of a reflective SLM display system designed in accordance with the present invention.

In another embodiment similar to system 400 of FIG. 4a, a birefringent element may be added to system 400 in order to provide results very similar to the results obtained by system 500 of FIG. 5a. Using like reference numerals to represent like components, FIG. 6 illustrates a system 600 including SLM 402, reflective backplane 403, compensator cell 404, polarizer 405, analyzer 406, static quarter wave plate 408, and light source 410. As described above for FIG. 4, polarizer 405 and analyzer 406 are crossed polarizers. However, in accordance with this embodiment of the invention, system 600 further includes an additional birefringent element 612 which can be positioned between SLM 402 and compensator cell 404, as shown here, or alternately, can be positioned between compensator cell 404 and static quarter wave plate 408.

In this embodiment, birefringent element 612 is a commercially available polycarbonate film having a retardance of approximately one half of the wavelength of the light for which the system is optimized, for example a wavelength of 510 nm. Alternatively, birefringent element 612 may be any birefringent material capable of providing the desired retardance such as poly vinyl alcohol or any other optically clear birefringent material.

In this embodiment, the buff axes of SLM 402 and compensator cell 404 are parallel to one another and birefringent element 612 has a primary axis which is oriented perpendicular to the buff axis of both SLM 402 and compensator cell 404. As describe above for system 400, polarizer 405 directs horizontally linearly polarized light into quarter wave plate 408 and quarter wave plate 408 is oriented at a 45 degree angle to the horizontally linearly polarized light. SLM 402, compensator cell 404, and birefringent element 612 may be oriented in any way relative to quarter wave plate 408 so long as the buff axes of SLM 402 and Compensator cell 404 are parallel to one another and the primary axis of birefringent element 612 is perpendicular to the buff axes of SLM 402 and compensator cell 404.

The addition of the birefringent element causes Case 1 and Case 3 for this embodiment to result in a bright state in which the throughput varies only slightly over the range of the wavelengths similar to curves 520 and 524 of FIGS. 5b and 5c. Also, the addition of the birefringent element causes Case 2 and Case 4 for this embodiment to result in a substantially more uniform dark state similar to lines 522 and 526 of FIGS. 5b and 5c. This results in a system that is able to provide a high contrast ratio while maintaining a relatively high throughput for the entire wavelength range even though crossed polarizers are utilized.

Although the above described embodiments have been described as having the static quarter wave plate positioned between the polarizer and the compensator cell, this is not a requirement. Instead, the static quarter wave plate may be located between the compensator cell and SLM and still remain within the scope of the invention.

Figure 7A:
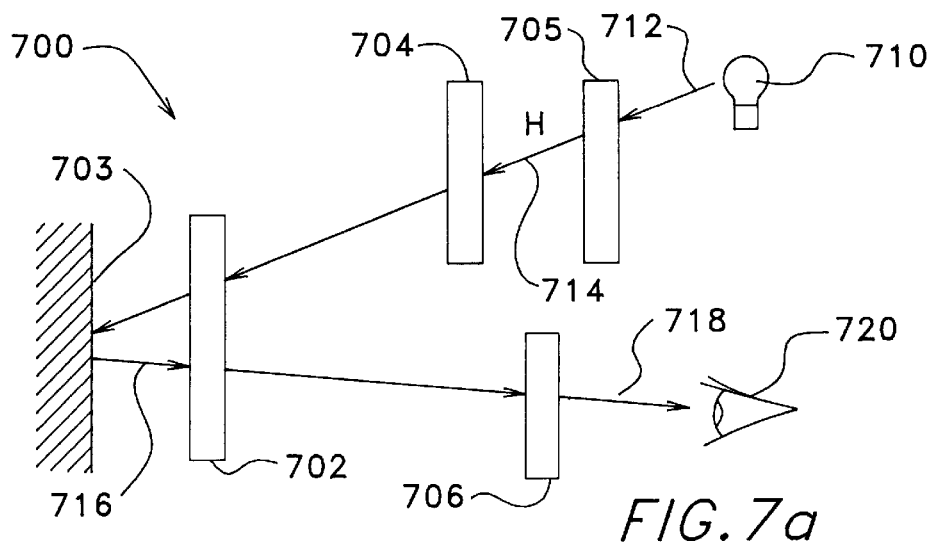
FIGS. 7a–b are diagrammatic cross sectional views of a fourth embodiment of a reflective SLM display system designed in accordance with the present invention.
Figure 7B:
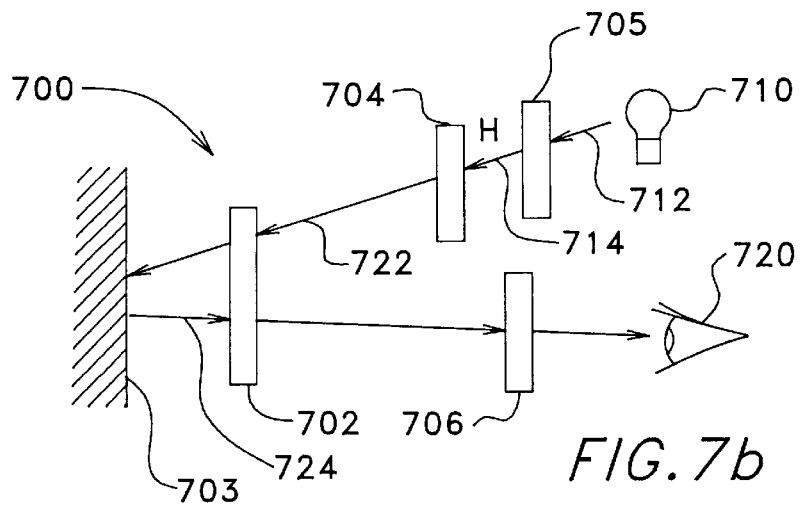

In another embodiment, an off axis system may be utilized in order to provide a continuously viewable DC field-balanced reflective display system. FIGS. 7a and 7b illustrate one embodiment of an off axis display system 700. As illustrated in FIGS. 7a and 7b, system 700 includes a SLM 702, a reflective backplane 703, a compensator cell 704, a polarizer 705, an analyzer 706, and a light source 710. In this embodiment, the light is directed into the SLM at an angle and reflected back into a viewing area indicated by viewer 720 such that the light directed into the system only passes through the compensator cell once rather than passing through the compensator cell twice as described above for the previously described embodiments.

Since the light only passes through compensator cell 704 once, the thickness of compensator cell 704 is configured to be twice the thickness of the SLM. Generally, SLM 702 has a thickness which causes SLM 702 to act as a quarter wave plate when switched to its A state and compensator cell 704 has a thickness which causes it to act as a half wave plate when it is switched to its A state. Therefore, in the case in which an FLC material is used for both the SLM and compensator cell that has a birefringence of 0.142, the thickness FLC material for the SLM would be approximately 900 nm and the thickness of the FLC material for the compensator cell would be approximately 1800 nm. Both SLM 702 and compensator cell are configured to have substantially no effect on the polarization of the light passing through them when they are switched to their B states.

For the configuration being described, polarizer 705 is configured to allow only horizontally linearly polarized light to be directed into the system. Analyzer 706 is configured to allow only vertically linearly polarized light to pass into the viewing area. Also, for this embodiment, the buff axis of compensator cell 704 is oriented perpendicular to the buff axis of SLM 702 and the buff axis of SLM 702 is advantageously oriented parallel to horizontally linearly polarized light directed into the system. Other orientations of the buff axes are also effective provided that the SLM and compensator cell buff axes remain perpendicular to one another.

As described above for the previous embodiments, the off axis configuration shown in FIGS. 7a and 7b provide identical results for Cases 1 and 3 and Cases 2 and 4. This configuration also provides good results over a broad spectrum similar to the results illustrated in FIGS. 5b and 5c. Therefore, system 700 is also able to provide a continuously viewable system which more effectively utilizes light from the light source when compared to the conventional reflective systems illustrated in FIGS. 1b–c and FIG. 3a.

Figure 8:
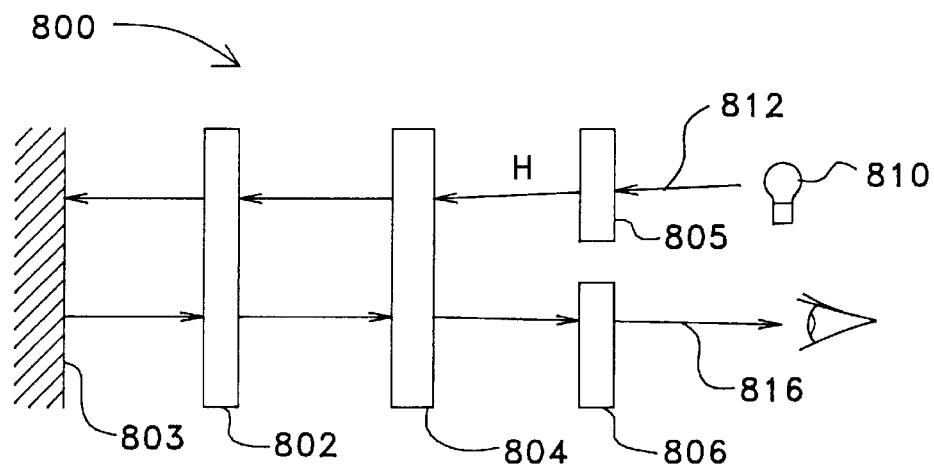
FIG. 8 is a diagrammatic cross sectional view of a fifth embodiment of a reflective SLM display system designed in accordance with the present invention.

Referring now to FIG. 8, an on axis system 800 that utilizes a compensator cell having a thickness approximately twice the thickness of the SLM will be described. As illustrated in FIG. 8, system 800 includes an SLM 802 having a reflective backplane 803, a compensator cell 804, a polarizer 805, and an analyzer 806. Alternatively, in the same manner as described above, crossed polarizer 805 and analyzer 806 may be replaced with a polarizing beam splitter.

System 800 is configured in a manner similar to that described above for system 400 of FIG. 4a. That is, compensator cell 804 is positioned adjacent SLM 802. Also, polarizer 805 is positioned to direct only horizontally linearly polarized light into compensator cell 804. Similarly, analyzer 806 allows only vertically linearly polarized light to pass through it and into the viewing area after the light directed in to the system has passed through compensator cell 804 and SLM 802 and been reflected back through SLM 802 and compensator cell 804. However, in accordance with this aspect of the invention, compensator cell 804 has a thickness and retardance that is substantially different than that of SLM 802. In the embodiment being described, compensator cell 804 has a thickness and retardance that is twice that of SLM 802.

System 800 further includes a light source 810 for directing light into the system in a manner similar to that described above for FIGS. 1b and 1c. With this configuration, light source 810 directs light into polarizer 805 as indicated by arrow 812. Polarizer 805 blocks any vertically linearly polarized portions of the light from passing through polarizer 805 and allows only horizontally linearly polarized portions of the light to pass through polarizer 805 into compensator cell 804. This light passes through compensator cell 804, and SLM 802 and is then reflected by reflective backplane 803 back through SLM 802 and compensator cell 804 to analyzer 806 as illustrated in FIG. 8. Analyzer 806 then blocks any horizontally linearly polarized portions of the light and allows only vertically linearly polarized portions of the light to pass through it to a viewing area indicated by viewer 816. Since polarizer 805 blocks vertically linearly polarized light and analyzer 806 blocks horizontally linearly polarized light, this type of system is referred to as using crossed polarizers.

For this embodiment, the FLC material of SLM 802 is configured to act as a quarter wave plate for a wavelength of 510 nm. However, as mentioned above, compensator cell 804 has a thickness and retardance that is twice that of SLM 802. Therefore, compensator cell 804 is configured to act as a half wave plate for a wavelength of 510 nm. In this configuration, the FLC material of SLM 802 is 900 nm thick and has a tilt angle of 22.5 degrees. However, the FLC material of compensator cell 804 is 1800 nm thick and has a tilt angle of half that of the FLC material of SLM 802, that is, 11.25 degrees.

Figures 9, 10A:
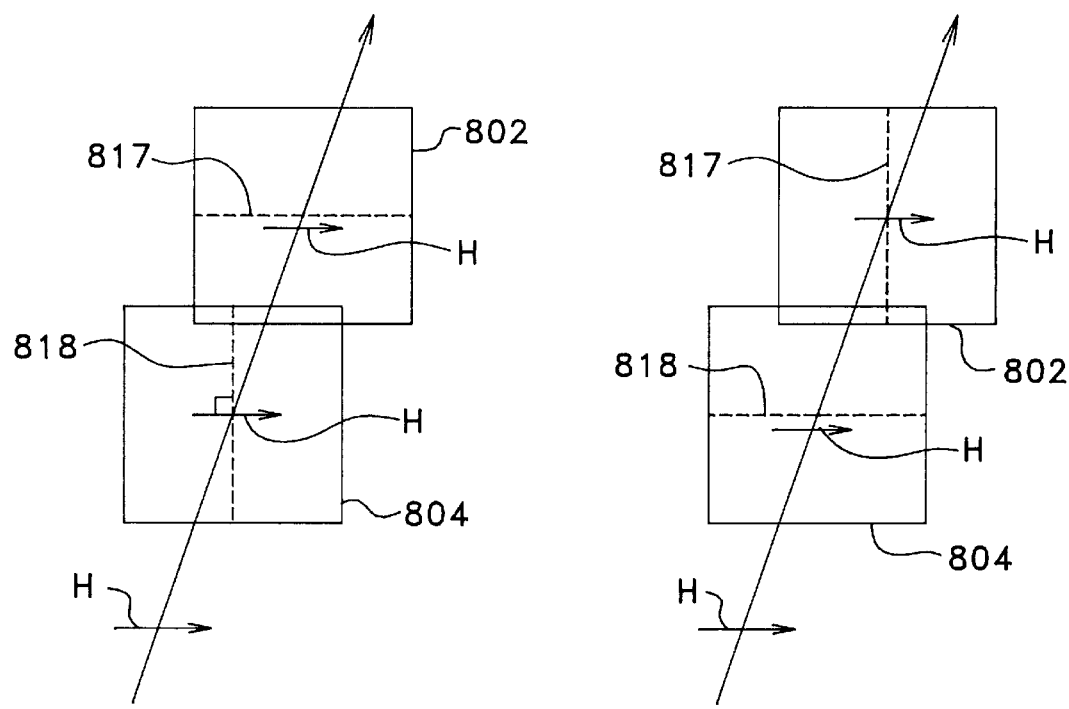
FIG. 9 is a diagram illustrating the relative rotational positions of the various components making up a first configuration of the system of FIG. 8.
FIGS. 10a–g are diagrams illustrating the relative rotational positions of the various components making up additional possible configurations of the system of FIG. 8.

In the specific configuration being described, which is illustrated in FIG. 9, the buff axis of SLM 802 (indicated by dashed line 817) is aligned with or parallel with the horizontally linearly polarized light directed into the system. Also, for this configuration, the buff axis of compensator cell 804 (indicated by dashed line 818) is positioned perpendicular to the buff axis 817 of SLM 802. Alternatively, the system works equally well when configured with the buff axis 817 of the SLM aligned perpendicular to the horizontally polarized light and the buff axis 818 of the compensator cell still perpendicular to the buff axis of the SLM. This configuration is illustrated in FIG. 10a.

Figure 10B:
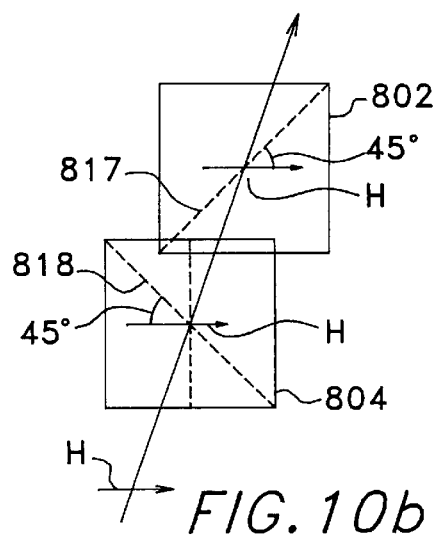
Figure 10C:
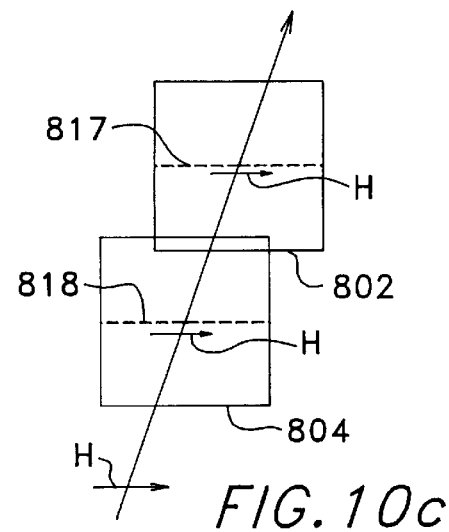
Figure 10D:
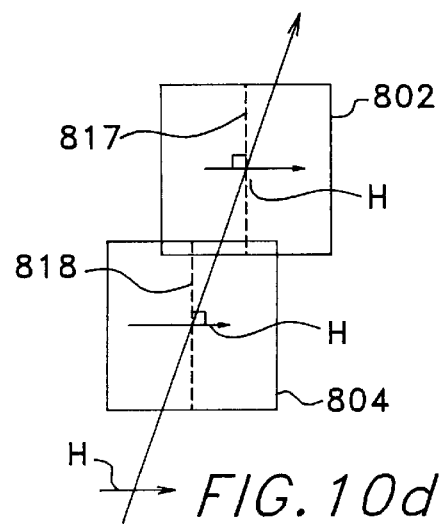
Figure 10E:
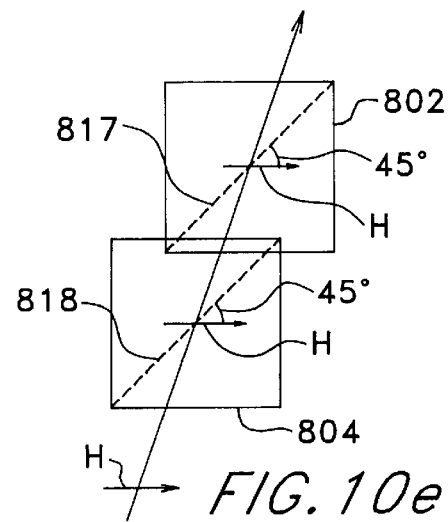

While these configurations may be preferred, other configurations still give useful performance characteristics. For example, with the buff axes 817 and 818 of the SLM and compensator still perpendicular, the buff axes can be oriented at 45 degrees to the horizontally polarized incident light as illustrated in FIG. 10b. In yet another example, the buff axes 817 and 818 of the SLM and the compensator cell can be parallel to each other and aligned either both parallel to the horizontally polarized light, as shown in FIG. 10c, or both perpendicular to the horizontally polarized light as shown in FIG. 10d. The same components can even be configured with both buff axis 817 and 818 being oriented at 45 degrees relative to the horizontally polarized light, as illustrated in FIG. 10e.

Alternately, the buff axis 817 of the SLM can be oriented at 112.5 degrees relative to the horizontally polarized light with the FLC material of the SLM again having a tilt angle of 22.5 degrees). In this configuration, the buff axis 818 of the compensator cell is oriented 11.25 degrees to the horizontally polarized light with the FLC material of the compensator cell again having a tilt angle of 11.25 degrees, or half that of the material of the SLM. This configuration is shown in FIG. 10f.

Figure 10F:
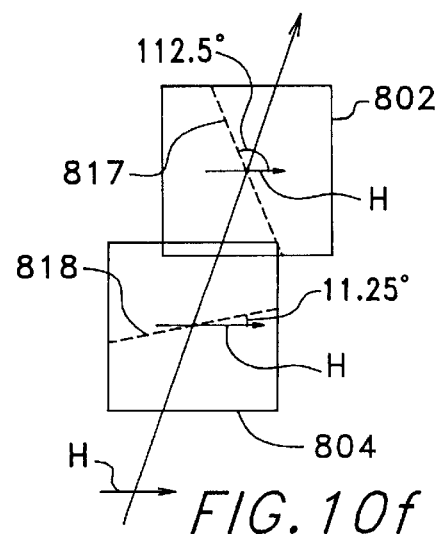

Additionally, the orientations of FIG. 10f can be oriented relative to the vertically polarized analyzer instead of relative to the horizontal polarizer without changing the results of the system. Finally, in still another specific configuration illustrated in FIG. 10g, the buff axis of the SLM can be oriented 22.5 degrees from the horizontally polarized input light while the buff axis of the compensator cell is oriented nearly parallel to the buff axis of the SLM, at 168.75 degrees from the horizontally polarized input light.

Although the tilt angles of SLM 802 and compensator cell 804 are described as being 22.5 degrees and 11.25 degrees respectively for the above described configurations, this is not a requirement. The configurations described above for this embodiment work for a range of tilt angles, but work best when the tilt angle of the compensator cell is half that of the SLM. For example, in the case of the configuration of FIG. 10f in which the FLC material of the SLM has a tilt angle different from 22.5 degrees, the SLM buff axis is preferably oriented at 90 degrees plus the SLM tilt angle from the horizontally polarized input light. Again, the compensator is preferably made from an FLC material having half the tilt of the SLM material, and the compensator buff axis of the compensator cell is preferably oriented an angle equal to its tilt angle from the horizontally polarized input light. Therefore, it should be understood that the present invention would equally apply to systems using SLMs and compensator cells having tilt angles other than 22.5 degrees and 11.25 degrees respectively.

Although only a few specific examples of configurations having particular buff angle orientations have been identified above, the present invention is not limited to these specific examples. Instead, the present invention equally applies to a wide variety of specific buff angle configurations. Generally, the configurations described above, along with many other useful configurations that result in a workable configuration, may be identified using the following equation.

$$P = 45\,N + 2\,C$$

The equation identifies solutions that provide the desired display system outputs. That is, the solutions identified by the equation result in a system configuration that produces two relatively bright states and two relatively good dark states. The equation is used to determine the required buff angle P (measured in degrees from the primary axis of the polarized light directed into the system) for the SLM for any given compensator buff angle C (also measured in degrees from the polarized light directed into the system) where N is an integer.

The above identified equation assumes that the retardance of the FLC material of the SLM is a quarter wave for visible light and that the retardance of the compensator cell is a half wave for visible light. It also assumes that the tilt angle B of the FLC material of the compensator cell is half that of the tilt angle D of the FLC material of the SLM. Generally, when N is an odd integer, the bright states will be the most tolerant to variations of the tilt angles B and D, especially when B=D/2 is maintained. Alternatively, when N is even, the dark states will be most tolerant to the same variations of tilt angles B and D. Better arrangements also result when D=22.5 degrees and B=11.25 degrees.

In the configuration of FIG. 9, the buff angle C of the compensator cell is 90 degrees. Therefore, when N is even, the buff angle P of the SLM is oriented a multiple of 90 degrees from the buff angle C of the compensator as required by the equation thus making the buff angles either perpendicular to or parallel to one another. Similarly, when N is odd, the equation results in an SLM buff angle that is rotated 45 degrees one way or the other relative to buff angle C of the compensator cell. All of these solutions provide workable configurations.

Figure 10G:
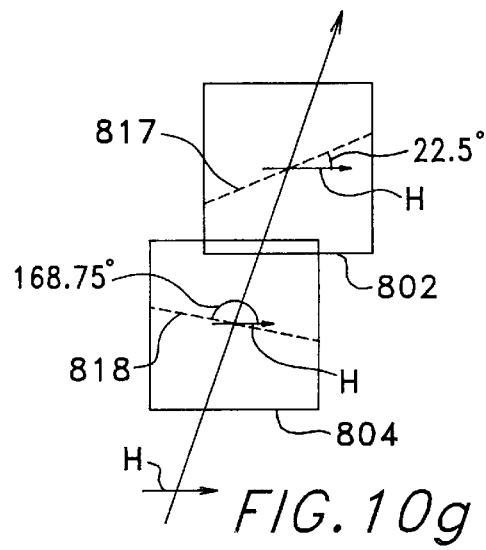

In the configuration of 10f, the compensator buff angle C is 11.25 degrees. Therefore, when N is equal to 2, the resulting SLM buff angle P is 112.5 degrees as described above. In the configuration of FIG. 10g, the compensator buff angle C is 168.75. Therefore, when N is equal to 1, the resulting SLM buff angle P is 382.5 degrees which is the same as 22.5 degrees as described above for FIG. 10f.

Now that the physical configuration of system 800 has been described, its effect on light directed into system 800 will be described. The use of the half wave compensator cell causes Case 1 and Case 3 for the embodiment described with reference to FIG. 9 to result in a bright state in which the throughput varies only slightly over the range of the wavelengths similar to curves 520 and 524 of FIGS. 5b and 5c. Also, for this configuration that aligns the buff axis of the SLM with the horizontally linearly polarized light directed into the system, Case 2 and Case 4 result in a substantially uniform dark state similar to lines 522 and 526 of FIGS. 5b and 5c. This results in a system that is able to provide a high contrast ratio while maintaining a relatively high throughput for the entire wavelength range. The configuration with the buff axes rotated by 90 degrees (i.e. the one with the SLM buff axis oriented with the vertically polarized output light, but the compensator buff axis still perpendicular to the SLM buff axis) gives the bright and dark states of the same characteristics as the configuration of FIG. 10(a). The other configurations generally give bright states with more throughput variation over the wavelength range and a less spectrally uniform dark state, but all provide the contrast reversal necessary for continuous viewing of the display system, and all provide high bright state throughput and a good dark state over at least a narrow range of wavelengths.

Although system 800 has been described as using crossed polarizers, this is not a requirement of the invention. Instead, parallel polarizes may be utilized. However, the use of parallel polarizers reverses the light and dark states and results, for the configuration described with reference to FIG. 10(a), in curves similar to those of FIGS. 4b and 4c. Although this configuration provides identical results for Cases 1 and 3 and Cases 2 and 4, it does not provide as good of a contrast ratio as system 800 using crossed polarizers.

Now that the effect system 800 has on light directed into system 800 has been described, a variety of methods and arrangements for controlling the tilt angle of compensator cell 804 and SLM 802 will be described. As mentioned above for system 800, it is important to maintain the tilt angle of the FLC material of compensator cell 804 at half the tilt angle of the FLC material of SLM 802. This may be accomplished in any manner and still remain within the scope of the invention.

Figure 11:
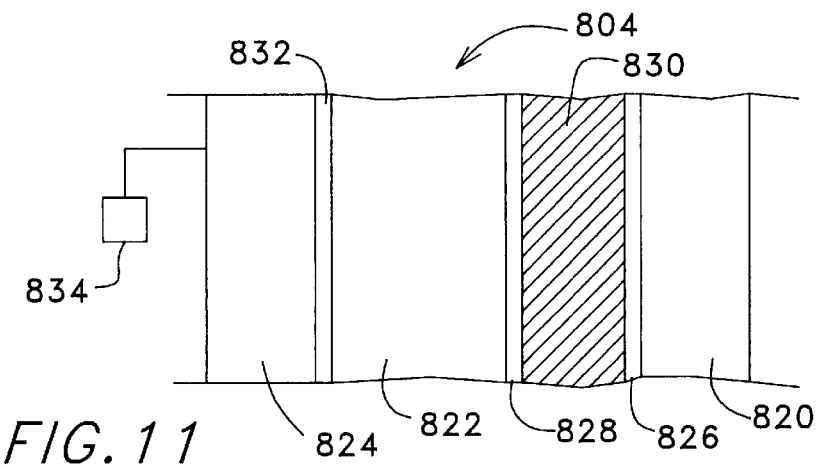
FIG. 11 is a diagrammatic partial cross sectional view of a portion of a compensator cell including a first embodiment of heater arrangement designed in accordance with the present invention.

As is know in the art, the tilt angle of FLC materials is temperature sensitive. That is, for typical FLC materials, the tilt angle of the FLC material decreases as the temperature of the FLC material increases. Therefore, one approach to controlling the tilt angle of the FLC material of the compensator cell is to control the temperature of the compensator cell. With this approach, the temperature of the FLC material of the compensator cell is controlled at an elevated temperature so that its tilt angle is half that of the tilt angle of the FLC material of the SLM. FIG. 11 illustrates a first embodiment of a heater arrangement designed in accordance with the invention for heating compensator cell 804 for this purpose.

In the embodiment shown in FIG. 11, compensator cell 804 is made up of three layers of glass substrate 820, 822, and 824. Glass layers 820 and 822 have inner faces 821 and 823 that respectively support electrodes 826 and 828. Electrodes 826 and 828 are transparent electrodes, such as Indium-Tin-Oxide (ITO), that allow a voltage to be applied to control the state of compensator cell 804. The FLC material of the compensator cell, indicated by reference numeral 830, is sandwiched between ITO electrodes 826 and 828. The third layer of glass, layer 824, has an inner surface 825 that supports a layer 832 of ITO material. Two electrical leads (not shown) are connected at opposite ends of ITO layer 832. These electrical leads are configured to provided electrical power to ITO layer 832 which ITO layer 832 dissipates as heat. Preferably the electrical leads are connected to opposite edges of ITO layer 832 along the entire length of each edge. This configuration causes ITO layer 832 to be uniformly heated so that it heats the entire compensator cell including FLC material 830. Compensator cell 804 further includes a temperature sensor 834 that is used to control the power provided to ITO layer 832. Therefore, the temperature of compensator cell 804 and FLC material 830 may be readily controlled.

Although only one specific embodiment of a heater arrangement is described above, it should be understood that a wide variety of heating arrangements may be used and still fall within the scope of the invention. For example, although ITO layer 832 is described as being attached to the inner surface 825 of glass layer 824, it should be understood that this is not a requirement. Instead, ITO layer 832 may be attached to the outside surface of glass layer 824 or alternatively to any of the glass layers.

Figure 12:
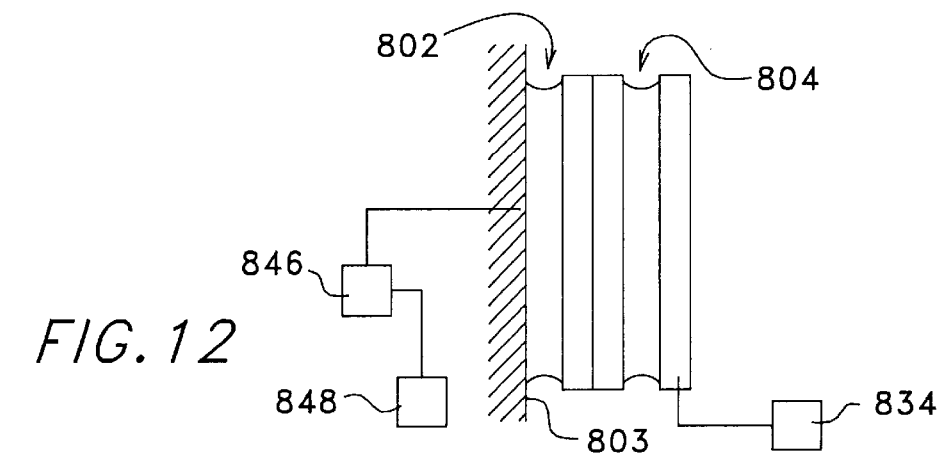
FIG. 12 is a diagrammatic partial cross sectional view of a portion of a compensator cell and SLM including a second embodiment of heater arrangement designed in accordance with the present invention.

In another embodiment, a combined compensator cell and SLM panel configuration, where the SLM and compensator cell are maintained at substantially the same temperature, can be built by using different FLC materials in the display panel and in the compensator cell. FIG. 12 illustrates one embodiment of such a configuration. In this embodiment, compensator cell 804 is attached directly to SLM 802. As described above, compensator cell 804 includes a heater arrangement, such as a layer of ITO material, that is used to maintain the temperature of the combination of compensator cell 804 and SLM 802 at a particular temperature. Alternatively, a variety of other heater arrangements may be used to maintain compensator cell 804 and SLM 802 at a constant temperature.

Figure 13:
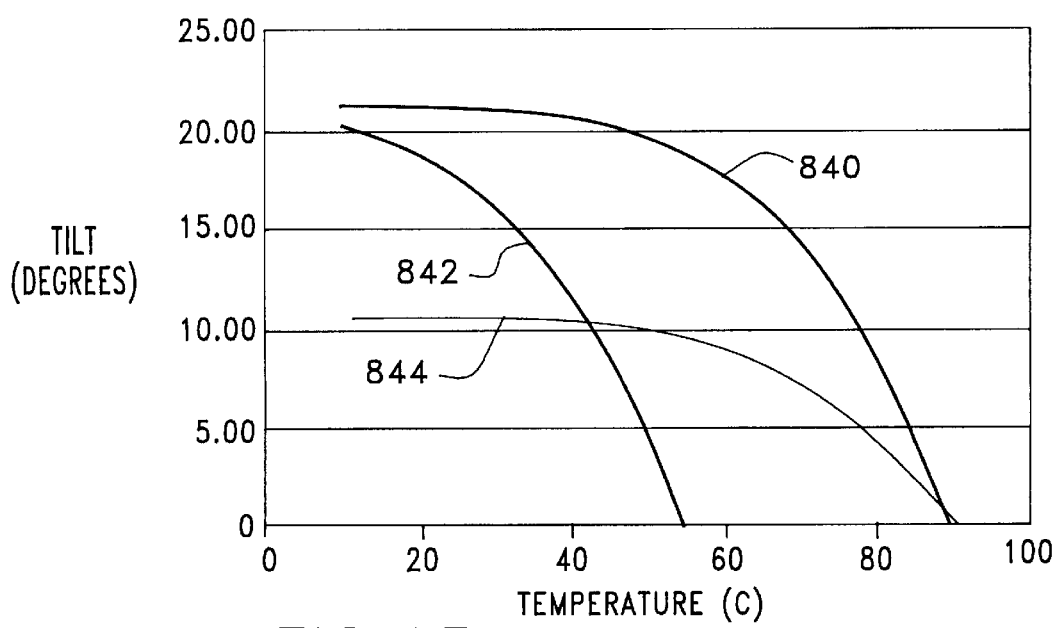
FIG. 13 is a graph illustrating the relative effects temperature has on the tilt angle of two different types of FLC material.

FIG. 13 illustrates the tilt angle vs. temperature characteristics of two exemplary FLC materials that may be used in the immediately above described configuration. A high temperature FLC material with the tilt angle vs. temperature characteristics indicated by curve 840 is used in SLM 802. A different, lower temperature FLC material with tilt angle vs. temperature characteristic indicated by curve 842 is used in the compensator cell. For reference, a curve showing half the tilt angle of the SLM FLC material of curve 840 is shown as curve 844. Both FLC materials illustrated are of the common type having a zero-tilt smectic A phase at temperatures above the ferroelectric smectic C phase. In the case of the material used in the SLM, the smectic A to smectic C phase transition temperature TAC has a value of about 90° C. (the temperature where the tilt goes to zero), while the material used in the compensator cell has a TAC value of about 55° C.

As can be seen from FIG. 13, the compensator tilt angle indicated by curve 842 has a value equal to half the SLM FLC tilt indicated by curve 844 at a temperature of about 40° C. (i.e. at the temperature where curve 842 and curve 844 intersect). By physically attaching the compensator cell to the display panel cell, as shown in FIG. 12, it is convenient to maintain them both at the same temperature. In a manner similar to that described above, the temperature of both cells together can be controlled, for example, by attaching a temperature sensor 834 to the combined compensator cell and SLM. A resistive heater 846 may be attached to the back of the SLM and a temperature control servomechanism 848 may be used to supply electrical current to resistive heater 846 in a manner to maintain sensor 834 at a desired set-point temperature.

In the case of the exemplary FLC materials illustrated with respect to the FIG. 13, setting the temperature-control set-point to 40° C. would result in operation with the compensator cell having half the SLM tilt, as desired for optimal operation of system 800. In general, the operation of such a temperature-controlled combined compensator/SLM can be achieved by filling the compensator cell with an FLC material having, at some temperature, a tilt angle substantially equal to half the tilt angle of the FLC material used in the SLM at that temperature. Specifically, this can be accomplished by filling the compensator cell with an FLC material having a $T_{AC}$ suitably lower than the $T_{AC}$ of the SLM FLC material.

Figure 14:
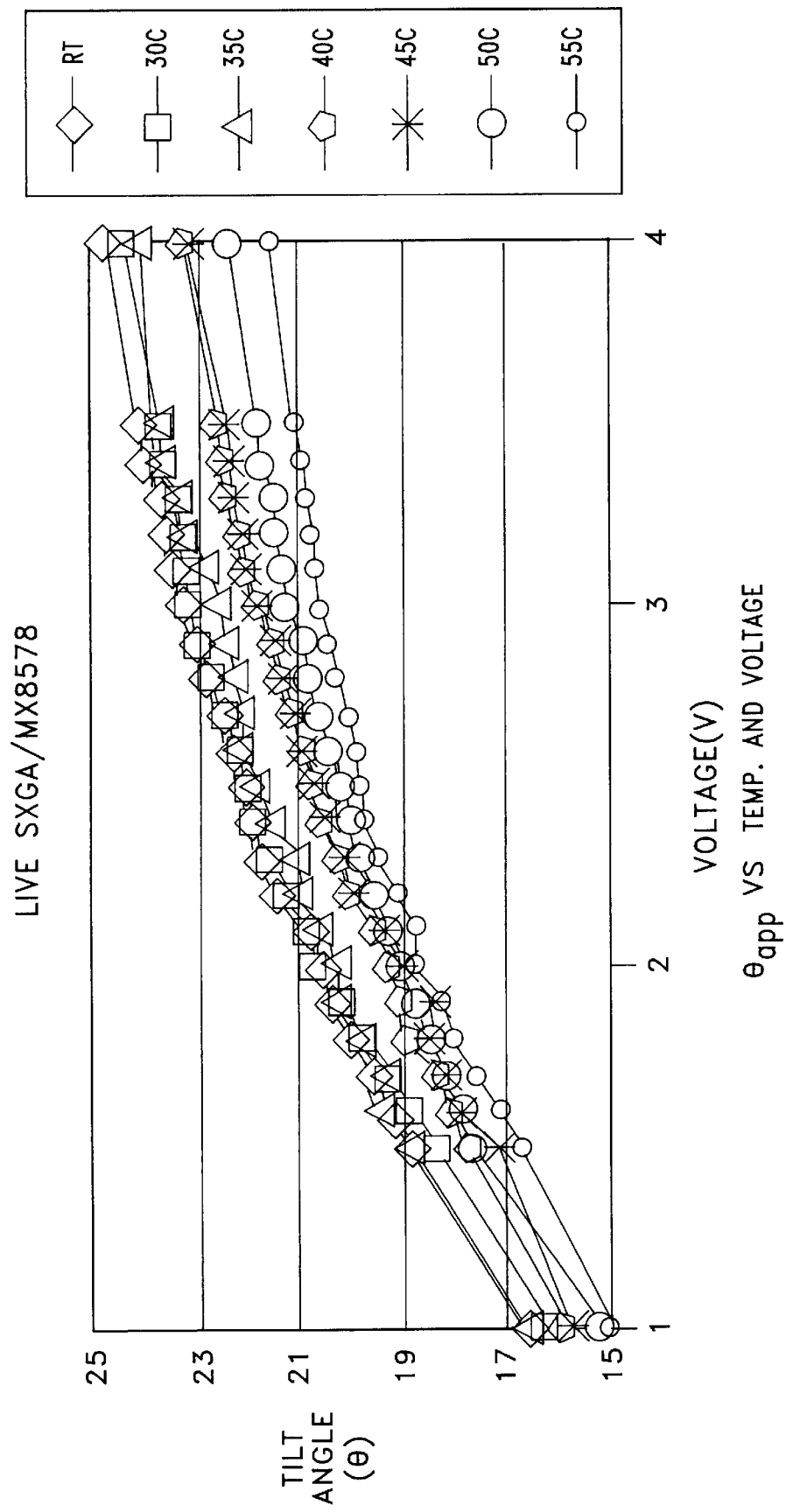
FIG. 14 is a graph illustrating the relative effects that temperature and drive voltage have on the tilt angle of a typical FLC material.

Another method of controlling the tilt angle of an FLC material is to control the drive voltage used to switch and maintain the FLC material in its A and B states. As described above in the background, FLC materials are switched to and maintained in their A and B states by establishing and maintaining certain drive voltages through the layers of FLC materials. Generally, lower drive voltages result in lower tilt angles and higher voltages result in larger tilt angles. FIG. 14 illustrates how the combination of drive voltage and temperature effect the tilt angle of a typical FLC material.

Because the tilt angle of FLC material varies in a predictable way as the drive voltage used to maintain the FLC material in their A and B states, the tilt angle of compensator cell 804 and SLM 802 may be controlled by applying the appropriate drive voltages. In a manner similar to that described above for the temperature controlling approach, the drive voltages for the compensator cell and the SLM may be controlled such that the resulting tilt angle of the compensator cell is half that of the SLM. However, one problem with this approach is that the switching speed of the FLC material is also effected by the drive voltage used to establish and maintain the FLC material in the desired state.

Figure 15:
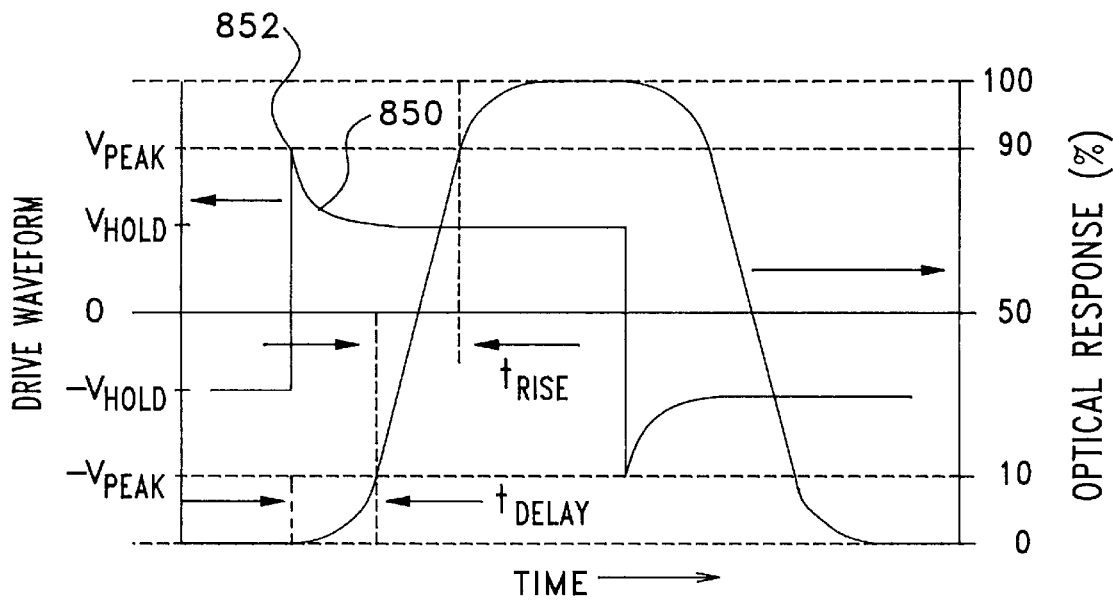
FIG. 15 is illustrates the use of a drive voltage waveform having a leading edge spike to improve the switching speed of a compensator cell that uses reduced drive voltage to reduce the tilt angle of the FLC material of the compensator cell.

In order to overcome this potential switching speed problem, the drive voltage used to establish and maintain the FLC material in the desired state may include a leading edge spike. FIG. 15 illustrates a drive voltage waveform 850 including a leading edge spike 852 that may be used to overcome the reduction of switching speed which may occur when a low voltage is used for the drive voltage in order to reduce the tilt angle of the compensator cell. In FIG. 15, $V_{hold}$ is a low voltage, e.g. 0.5–2.0 Volts, which is adjusted to tune the FLC tilt angle of compensator cell 804 to exactly half of the tilt angle of the FLC in associated SLM 802. However, $V_{hold}$ is too low a voltage to cause the FLC of compensator cell 804 to switch quickly between its two states. $V_{peak}$ is a high voltage, e.g. 6 Volts, which drives the FLC material of compensator cell 804 quickly between its two states. If left on the compensator, $V_{peak}$ would produce a tilt angle that is much too high. Thus, the applied voltage is reduced from $V_{peak}$ to $V_{hold}$ after the fast switching has been accomplished.

Any combination of the above described two approaches may be used to controlling the tilt angle of the FLC material of the compensator cell or the combination of the compensator cell and the SLM. For example, relatively low drive voltages may be used to drive the compensator cell while the compensator cell is maintained at an elevated temperature compared to the SLM. The combination of these two approaches may be used to cause the FLC material of the compensator cell to have a tilt angle half that of the FLC material of the SLM.

It may be desirable to implement an SLM plus compensator display system according to one of the above configurations where it is not necessary to know exactly at what voltage or temperature the desired tilt angle of the FLC compensator material is obtained. This can be accomplished with a servo system that detects the display system dark state intensities and how these intensities vary with compensator drive voltage. Given the variation of compensator tilt angle with voltage shown in an exemplary way in FIG. 14, the display system dark state output intensity should vary with compensator cell drive voltage as shown in FIG. 16 when the pixel state is such that a positive compensator-cell drive voltage produces a display system dark state.

Figure 16:
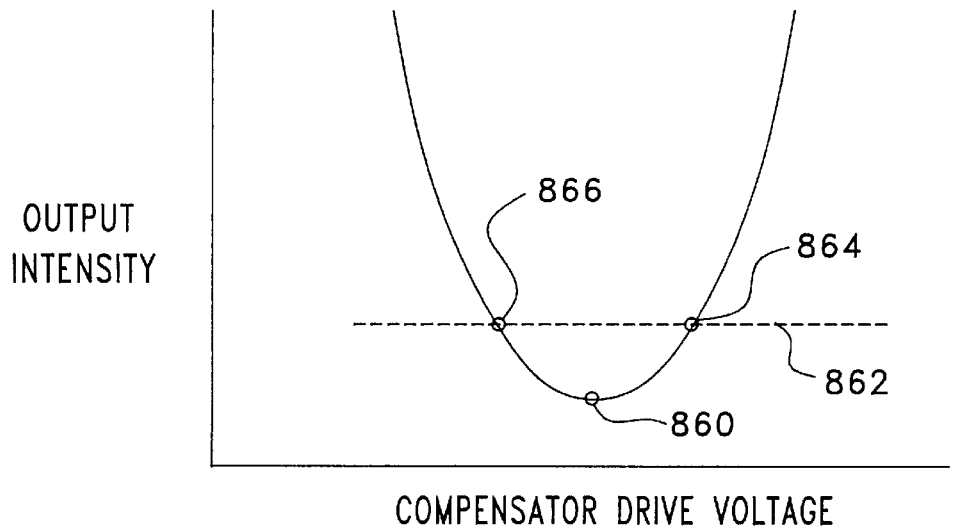
FIG. 16 is a graph indicating the effect that the compensator drive voltage has on the optical output of the system.

As can be seen in FIG. 16, there is an optimum compensator drive voltage which produces a minimum display system output intensity, indicated by point 860. This is the drive voltage which results in the compensator cell optic axis orientation most nearly approximating that required by the configurations described above. If the display system happened not to be at this optimum point, the needed corrective action could be determined as follows. Suppose the system output intensity had the non-minimum level indicated by dashed line 862. Suppose further that a slight increase in the compensator drive voltage caused a further increase to the display system output intensity level. Then, the system must be operating near point 864 indicated in FIG. 16. This means that the system contrast could be improved if the compensator cell tilt were reduced by reducing the compensator drive voltage. Alternately, suppose that a slight increase in the compensator drive voltage caused a decrease to the display system output intensity. Then, the system must be operating near point 866 indicated in FIG. 16. This means that the system contrast could be improved if the compensator cell tilt were increased by increasing the compensator drive voltage.

Figure 17:
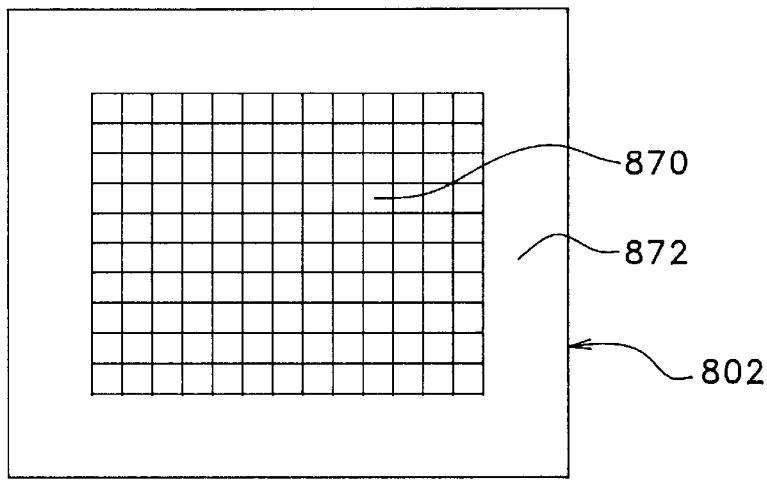
FIG. 17 is a diagrammatic illustration of another embodiment of a spatial light modulator panel designed in accordance with the invention.
Figure 18:
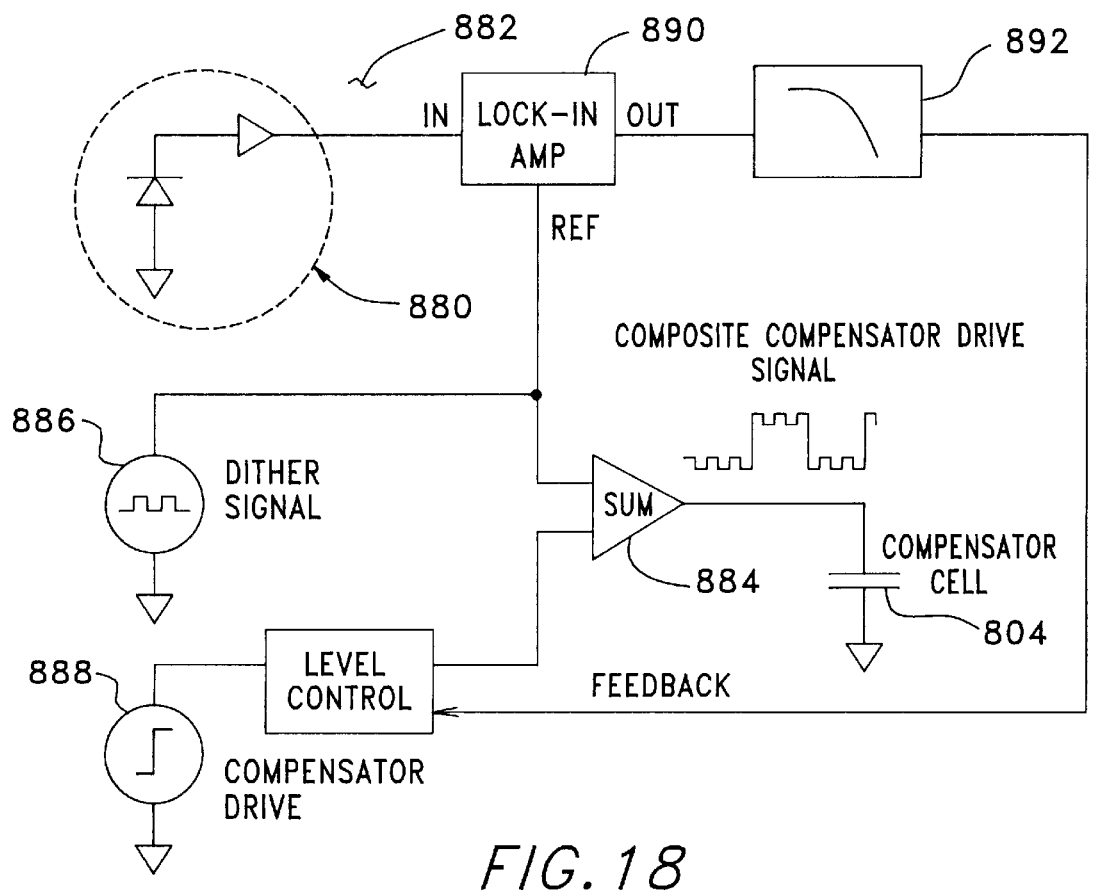
FIG. 18 is a schematic diagram illustrating a servomechanism circuit designed in accordance with the invention.

A servomechanism that can automatically keep the compensator cell tilt at its optimum value is shown in FIG. 18. In this embodiment, the pixel array, indicated by region 870 in FIG. 17, of SLM 802 has an adjacent or surrounding apron area 872. Apron area 872 functions in exactly the same way that the pixels function, but is not part of the desired image. However, the apron area is driven so that it should always produce a dark output state, even as the compensator cell is switched to accomplish DC balancing of both the pixel area and the apron area. Display system output light from this apron area is imaged onto a photodetector 880 (shown in FIG. 18) that provides an input signal 882 for the servomechanism. The compensator cell is driven from a signal source 884 that adds a small high-frequency dither signal 886 to a lower-frequency alternating polarity drive signal 888. For example, if the display system were performing DC balance such that an image data frame and an inverse image data frame were displayed on the SLM in a period having a total duration of ⅟₆₀ of a second, the compensator cell would be cycling at a rate of 60 Hz. The lower-frequency compensator drive signal 888 would be a 60 Hz square wave having an amplitude of, for example, 1.5 V. The dither signal 886 could then be, for example, a 2400 Hz square wave with an amplitude of 0.2 V.

When the apron drive voltage is such that the positive portion of the compensator-cell square-wave drive waveform should produce a display system output dark state, the output of the photodetector is detected by a phase-sensitive detector or lock-in amplifier 890 whose reference input is driven by the dither signal 886. As is well known in the art, this type of detection scheme produces a positive output when the input signal (the photodetector output) is in phase with the reference signal (the compensator dither signal) and a negative output when the input signal is out of phase with the reference signal. This output signal can be low-pass filtered using low pass filter 892 to remove unwanted noise.

The sign of the lock-in amplifier output signal indicates whether the compensator tilt angle is too much or too little, and the magnitude of the signal indicates the degree of error. The servomechanism feeds this lock-in amplifier output signal back to control the level of the compensator cell drive voltage in such a way as to reduce the error signal to zero. If the error signal is positive (dark-state output intensity increasing with compensator drive voltage), then the amplitude of the lower-frequency compensator drive voltage is reduced. If the error signal is negative (dark-state output intensity decreasing with compensator drive voltage), then the amplitude of the lower-frequency compensator drive voltage in increased.

The description above characterizes the performance of the servo system during the phase when the apron (or dark pixels) are driven such that a positive compensator cell drive voltage produces a display system output dark state. The servo system operates similarly during the other phase when the compensator is driven with a negative voltage, but the feedback sense is reversed to accommodate the fact that reversal of the change in output intensity with variation of compensator drive voltage. The servomechanism need not constrain the positive and negative compensator drive voltages to be equal in magnitude; different magnitudes can be used to correct for small compensator buff-axis misorientations that arise, for example, as a result of non-zero manufacturing assembly tolerances.

The servomechanism was described above as operating on the compensator cell drive voltage. The servo could equally well operate on the compensator temperature. In the case of operating on temperature, if the lock-in detected that the compensator tilt was larger than optimum, a feedback signal could be supplied to the compensator temperature controller that would cause the compensator temperature to be increased, and vice versa.

Although only certain specific embodiments of the present invention have been described in detail, it should be understood that the present invention may be embodied in many other specific forms without departing from the spirit or scope of the invention. For example, although -the systems have been described above as using horizontally linearly polarized light as the initial input light polarization, this is not a requirement. Instead, it should be understood that the initial input light polarization may alternatively be vertically linearly polarized light. Also, although only two specific examples of how to control the tilt angle of the FLC material of the compensator cell using heating and reduced drive voltage have been described, it should be understood that the present invention is not limited to these specific examples. Instead, any combination of these two approaches, or any other method of controlling the tilt angle, may be utilized and still fall within the scope of the invention. Therefore, the present examples are to be considered as illustrative and not restrictive, and the invention is not to be limited to the details given herein, but may be modified within the scope of the appended claims.

What is claimed is:

1. A display system for acting on light entering the system, the display system comprising:
   a) a reflective ferroelectric liquid crystal spatial light modulator including a layer of ferroelectric liquid crystal light modulating medium divided into an array of individually controllable pixels, each pixel being switchable between a first pixel state and a second pixel state;
   b) a polarizer arrangement including a polarizer for polarizing the light entering the system and directing the polarized light into the spatial light modulator along an optical path having an optical path axis, the reflective spatial light modulator acting on the polarized light to produce an optical output that is directed from the spatial light modulator back into the polarizing arrangement along substantially the same optical path axis that the polarized light is directed into the spatial light modulator, the polarizing arrangement including an analyzer configured to receive and analyze the optical output of the spatial light modulator and to direct the analyzed optical output out of the system; and
   c) a compensator positioned in the optical path between the polarizer of the polarizing arrangement and the spatial light modulator and in the optical path between the spatial light modulator and the analyzer, the compensator including a layer of ferroelectric liquid crystal light modulating medium switchable between a first compensator state and a second compensator state, the layer of ferroelectric liquid crystal light modulating medium of the compensator and the spatial light modulator having single pass retardances that are substantially different than one another.

2. A display system according to claim 1 wherein the layer of ferroelectric liquid crystal light modulating medium of the compensator has a thickness substantially different than the thickness of the layer of ferroelectric liquid crystal light modulating medium of the spatial light modulator.

3. A display system according to claim 1 wherein the compensator and the spatial light modulator combine so as to cause the display system to operate such that
   a) during a first case when the compensator is in the first compensator state and one of the pixels of the spatial light modulator is in the first pixel state, the display output corresponding to that pixel is a first optical intensity,
   b) during a second case when the compensator is in the first compensator state and one of the pixels of the spatial light modulator is in the second pixel state, the display output corresponding to that pixel is a second optical intensity,
   c) during a third case when the compensator is in the second compensator state and one of the pixels of the spatial light modulator is in the first pixel state, the display output corresponding to that pixel is a third optical intensity, and
   d) during a fourth case when the compensator is in the second compensator state and one of the pixels of the spatial light modulator is in the second pixel state, the display output corresponding to that pixel is a fourth optical intensity, the first and fourth optical intensities being substantially equal and the second and third optical intensities being substantially equal.

4. A display system according to claim 1 wherein the polarizing arrangement is a polarizing beam splitting cube that acts as both the polarizer and the analyzer.

5. A display system according to claim 1 wherein the layer of ferroelectric liquid crystal light modulating medium of the compensator is a thickness and retardance that causes the compensator to act as approximately a half wave plate for visible light and the layer of ferroelectric liquid crystal light modulating medium associated with a pixel of the spatial light modulator is a thickness and retardance that causes the pixel to act as approximately a quarter wave plate for visible light.

6. A display system according to claim 5 wherein the polarizer of the polarizing arrangement has a primary axis and the polarizer allows substantially only linearly polarized light aligned with the primary axis of the polarizer to pass through the polarizer into the spatial light modulator and wherein the layer of ferroelectric liquid crystal light modulating medium of both the compensator and the spatial light modulator each have an associated buff axis and tilt angle such that
   i) when the layer of ferroelectric liquid crystal light modulating medium of the compensator and the spatial light modulator are switched to their first states, the ferroelectric liquid crystal material is aligned generally at the tilt angle in a particular direction from the buff axis and
   ii) when the layer of ferroelectric liquid crystal light modulating medium of the compensator and the spatial light modulator are switched to their second states, the ferroelectric liquid crystal material is aligned generally at the tilt angle in a direction opposite the particular direction from the buff axis,
   the tilt angle of the layer of ferroelectric liquid crystal light modulating medium of the compensator being approximately one half that of the tilt angle of the layer of ferroelectric liquid crystal light modulating medium of the spatial light modulator.

7. A display system according to claim 6 wherein:
   a) the polarizer arrangement acts as crossed polarizers,
   b) the buff axis associated with the layer of ferroelectric liquid crystal light modulating medium of the spatial light modulator is oriented perpendicular to the buff axis associated with the layer of ferroelectric liquid crystal light modulating medium of the compensator, and c) the buff axis associated with the layer of ferroelectric liquid crystal light modulating medium of either the compensator or the spatial light modulator is aligned with the primary axis of the polarizer.

8. A display system according to claim 6 wherein:

a) the polarizer arrangement acts as crossed polarizers, b) the buff axis associated with the layer of ferroelectric liquid crystal light modulating medium of the spatial light modulator is rotated approximately 90 degrees plus the tilt angle of the ferroelectric liquid crystal light modulating medium of the spatial light modulator relative to the primary axis of the polarizer, and c) the buff axis associated with the layer of ferroelectric liquid crystal light modulating medium of the compensator is rotated an angle approximately equal to the tilt angle of the ferroelectric liquid crystal light modulating medium of the compensator relative to the primary axis of the polarizer.

9. A display system according to claim 6 wherein the system includes a heating arrangement for heating the layer of ferroelectric liquid crystal light modulating medium of the compensator in order to maintain the layer of ferroelectric liquid crystal light modulating medium of the compensator at a substantially constant temperature, the compensator including a transparent ITO layer that acts as the heating arrangement.

10. A display system according to claim 6 wherein the system includes a heating arrangement for heating the layers of ferroelectric liquid crystal light modulating medium of the compensator and the spatial light modulator in order to maintain the layers of ferroelectric liquid crystal light modulating medium of the compensator and spatial light modulator at a substantially constant temperature, the compensator and the spatial light modulator being positioned adjacent one another and in direct contact with one another, the layer of ferroelectric liquid crystal light modulating medium of the compensator having a tilt angle approximately one half that of the layer of ferroelectric liquid crystal light modulating medium of the spatial light modulator at the constant temperature maintained by the heating arrangement.

11. A display system according to claim 6 wherein the layer of ferroelectric liquid crystal light modulating medium of the compensator is switched to and maintained in its first and second states by establishing and maintaining certain drive voltages through the layer of ferroelectric liquid crystal light modulating medium, the system using certain compensator drive voltages to maintain the layer of ferroelectric liquid crystal light modulating medium of the compensator in the first and second compensator states such that the tilt angle of the layer of ferroelectric liquid crystal light modulating medium of the compensator is caused to be approximately one half that of the tilt angle of the layer of ferroelectric liquid crystal light modulating medium of the spatial light modulator.

12. A display system according to claim 11 wherein the system further includes a servo arrangement for automatically adjusting the tilt angle of the layer of ferroelectric liquid crystal light modulating medium of the compensator by adjusting the compensator drive voltages used to maintain the layer of ferroelectric liquid crystal light modulating medium of the compensator in the first and second compensator states.

13. A display according to claim 11 wherein the compensator drive voltages used to maintain the layer of ferroelectric liquid crystal light modulating medium of the compensator in the first and second compensator states include a leading edge spike of voltage at a voltage greater than the compensator drive voltages in order to improve the speed at which the layer of ferroelectric liquid crystal light modulating medium of the compensator may be switched between the first and second compensator states.

14. A display system according to claim 13 wherein the system further includes a heating arrangement for heating the layer of ferroelectric liquid crystal light modulating medium of the compensator in order to maintain the layer of ferroelectric liquid crystal light modulating medium of the compensator at a desired temperature, the servo arrangement being configured to control the desired temperature.

15. A display system according to claim 6 wherein the system further includes a servo arrangement for automatically adjusting the tilt angle of at least one of the layers of ferroelectric liquid crystal light modulating medium.

* * * * *